(12) United States Patent  (10) Patent No.: US 11,878,688 B2
Uematsu et al.  (45) Date of Patent: Jan. 23, 2024

(54) VEHICLE CONTROL APPARATUS

(71) Applicant: DENSO CORPORATION, Kariya (JP)

(72) Inventors: Takumi Uematsu, Kariya (JP); Mitsuhiro Tokimasa, Kariya (JP); Michihiro Kuroki, Kariya (JP)

(73) Assignee: DENSO CORPORATION, Kariya (JP)

( * ) Notice: Subject to any disclaimer, the term of this patent is extended or adjusted under 35 U.S.C. 154(b) by 514 days.

(21) Appl. No.: 17/111,450

(22) Filed: Dec. 3, 2020

(65) Prior Publication Data

US 2021/0114595 A1 Apr. 22, 2021

Related U.S. Application Data

(63) Continuation of application No. PCT/JP2019/020821, filed on May 27, 2019.

(30) Foreign Application Priority Data

Jun. 6, 2018 (JP) .................................. 2018-108523

(51) Int. Cl.
B60W 30/165 (2020.01)
B60W 30/095 (2012.01)
B60W 30/14 (2006.01)

(52) U.S. Cl.
CPC ...... B60W 30/165 (2013.01); B60W 30/0956 (2013.01); B60W 30/146 (2013.01);
(Continued)

(58) Field of Classification Search
CPC .......... B60W 30/165; B60W 30/0956; B60W 30/146; B60W 2554/4041;
(Continued)

(56) References Cited

U.S. PATENT DOCUMENTS

2003/0043030 A1* 3/2003 Kudo ..................... G06F 18/00
348/148
2004/0181339 A1* 9/2004 Mukaiyama ....... B60K 31/0008
340/436

(Continued)

FOREIGN PATENT DOCUMENTS

JP H06-024271 A 2/1994
JP H06-298023 A 10/1994

(Continued)

OTHER PUBLICATIONS

English translation of JP 2016207022, Haruhisa, Kore; Dec. 8, 2016 (Year: 2016).*

Primary Examiner — Abby Y Lin
Assistant Examiner — Danielle Marie Jackson
(74) Attorney, Agent, or Firm — MASCHOFF BRENNAN

(57) ABSTRACT

In a vehicle control apparatus, an entry determiner determines, while one of the following traveling mode and the constant-speed traveling mode is performed by the vehicle control apparatus, whether an entry condition is satisfied in response to determination that there is at least one other crossing vehicle. The entry condition enables the at least one other crossing vehicle to cross in front of the own vehicle to thereafter enter the enterable space without colliding with the own vehicle. An autonomous driving controller switches, upon the entry condition being determined to be satisfied, the performed one of the following traveling mode and the constant-speed traveling mode to a crossing mode that controls traveling of the own vehicle to ensure a predetermined space in front of the own vehicle. The predetermined space enables the at least one other crossing vehicle to cross in front of the own vehicle.

10 Claims, 22 Drawing Sheets

(52) U.S. Cl.
CPC .............. *B60W 2554/4041* (2020.02); *B60W 2554/4045* (2020.02); *B60W 2554/802* (2020.02)

(58) Field of Classification Search
CPC ... B60W 2554/4045; B60W 2554/802; B60W 2720/10; B60W 2754/30; B60W 30/09; B60W 30/095; B60W 30/14; B60W 30/18163; B60W 30/182; B60W 60/0015; B60W 60/0027; G08G 1/16
See application file for complete search history.

(56) References Cited

U.S. PATENT DOCUMENTS

| | | |
|---|---|---|
| 2017/0361841 A1 | 12/2017 | Kojo |
| 2019/0272750 A1 | 9/2019 | Fukumoto et al. |
| 2019/0283751 A1* | 9/2019 | Ueda .................... G06V 20/584 |
| 2019/0286160 A1* | 9/2019 | Toda .................... G05D 1/0214 |

FOREIGN PATENT DOCUMENTS

| | | |
|---|---|---|
| JP | 2016-207022 A | 12/2016 |
| JP | 2017224064 A | 12/2017 |

* cited by examiner

US 11,878,688 B2

VEHICLE CONTROL APPARATUS

CROSS REFERENCE TO RELATED APPLICATION

This application is a bypass continuation application of currently pending international application No. PCT/JP2019/20821 filed on May 27, 2019 designating the United States of America, the entire disclosure of which is incorporated herein by reference.

This application is based on and claims the benefit of priority from Japanese Patent Application No. 2018-108523 filed on Jun. 6, 2018, the entire disclosure of which is incorporated herein by reference.

TECHNICAL FIELD

The present disclosure relates to technologies for controlling the driving of an own vehicle.

BACKGROUND

An example of a conventional technology applicable to an own vehicle is configured to widen the following distance to a preceding vehicle traveling in front of the own vehicle, and cause the headlight of the own vehicle to flash via a switch when permitting an oncoming vehicle traveling on an oncoming lane to pass through the space between the preceding vehicle and the own vehicle. This flashing of the headlight sends permission of the passing to the oncoming vehicle.

SUMMARY

An exemplary aspect of the present disclosure provides a vehicle control apparatus. The vehicle control apparatus includes an entry determiner configured to determine, while one of the following traveling mode and the constant-speed traveling mode is performed by the vehicle control apparatus, whether an entry condition is satisfied in response to determination that there is at least one other crossing vehicle. The entry condition represents a condition that enables the at least one other crossing vehicle to cross in front of the own vehicle to thereafter enter the enterable space without colliding with the own vehicle. The vehicle control apparatus includes an autonomous driving controller configured to switch, upon the entry condition being determined to be satisfied, the performed one of the following traveling mode and the constant-speed traveling mode to a crossing mode that controls traveling of the own vehicle to ensure a predetermined space in front of the own vehicle. The predetermined space enables the at least one other crossing vehicle to cross in front of the own vehicle.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
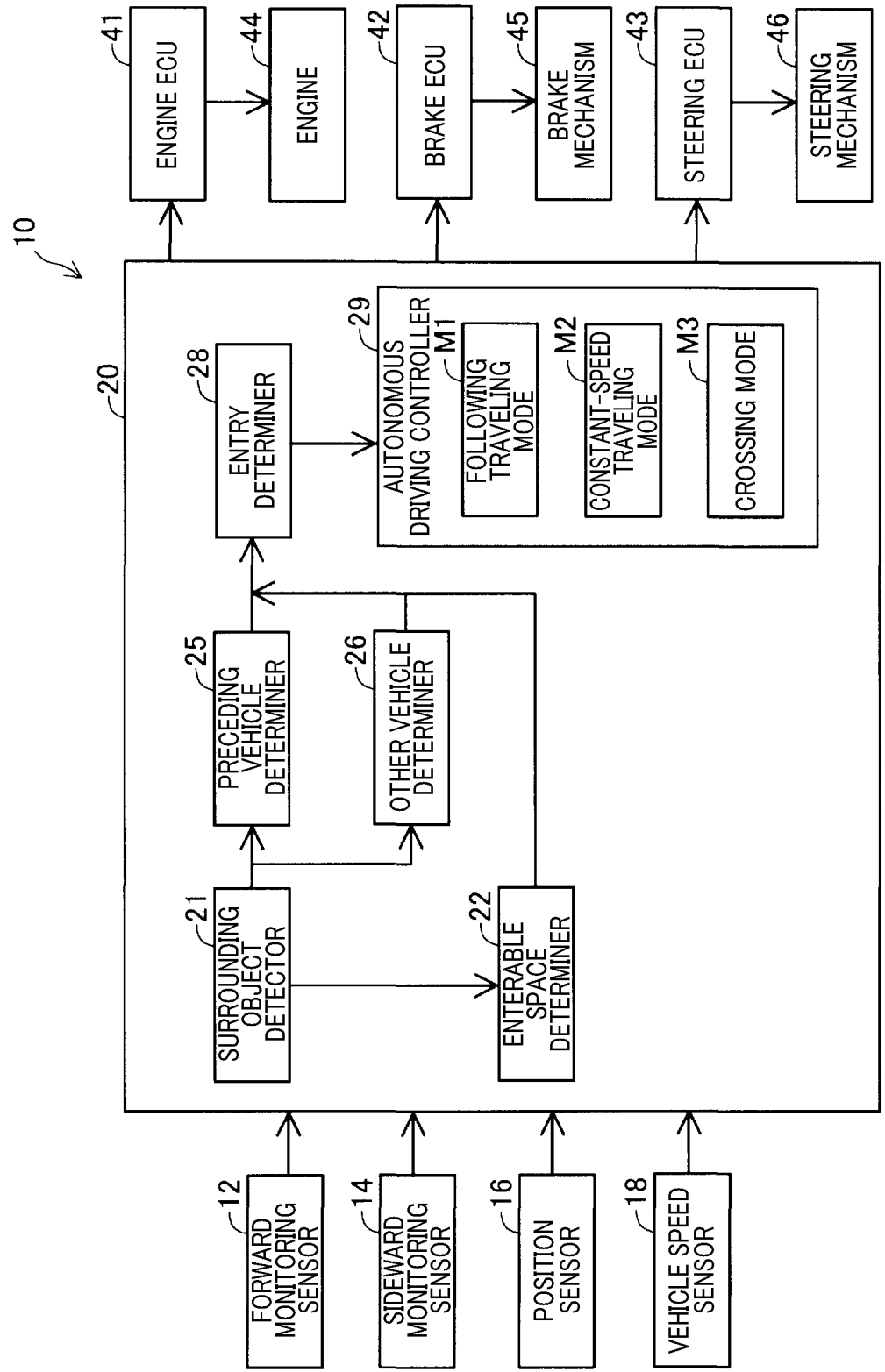
FIG. 1 is a block diagram of an own vehicle including a vehicle control apparatus according to the first embodiment.

The above conventional technology is for example disclosed in Japanese Patent Application publication No. H06-

24271. Additionally, the conventional technology is configured to cause one or more warning lamps mounted to the left side of the body of the own vehicle to flash simultaneously with flashing of the headlight for sending permission for the passing to the oncoming vehicle. This flashing of the one or more warning lamps issues a warning to a vehicle that is parallelly traveling on a left-side strip of a present lane on which the own vehicle is traveling.

Even if the above conventional technology is applied to the own vehicle, it may be difficult for an oncoming vehicle to safely pass through the space between the own vehicle and the preceding vehicle traveling in front of the own vehicle when the own vehicle is controlled to (i) follow the preceding vehicle or (ii) travel at a pre-set constant speed. This may cause a traffic jam.

In addition, even if the above conventional technology is applied to the own vehicle, it may be difficult for an oncoming vehicle to safely pass through the space between the own vehicle and the preceding vehicle traveling when the own vehicle is controlled to be stopped to follow the stop of the preceding vehicle so that the space is narrower. This may also cause a traffic jam.

The driver of a vehicle parallelly traveling on the left-side strip of the present lane of the own vehicle may miss the issuance of a warning carried out by the conventional technology based on the flashing of the one or more warning lamps.

The present disclosure aims to solve at least one of the issues described above, and can be implemented by the following exemplary aspects.

A vehicle control apparatus is provided as a first exemplary aspect in the exemplary aspects of the present disclosure. The vehicle control apparatus of the first exemplary aspect includes a vehicle control apparatus for performing a following traveling mode and a constant-speed traveling mode, the following traveling mode representing a mode that causes an own vehicle to travel on a travel lane and follow a preceding vehicle travelling in front of the own vehicle, the constant-speed traveling mode representing a mode that causes the own vehicle to travel at a preset constant speed. The vehicle control apparatus includes an other vehicle determiner configured to determine whether there is at least one other crossing vehicle that is estimated to cross in front of the own vehicle to thereafter enter an enterable space. The enterable space represents a space that is located in front of the own vehicle, and that is located on a portion branching from the travel lane. The vehicle control apparatus includes an entry determiner configured to determine, while one of the following traveling mode and the constant-speed traveling mode is performed by the vehicle control apparatus, whether an entry condition is satisfied in response to determination that there is at least one other crossing vehicle. The entry condition represents a condition that enables the at least one other crossing vehicle to cross in front of the own vehicle to thereafter enter the enterable space without colliding with the own vehicle. The vehicle control apparatus includes an autonomous driving controller configured to switch, upon the entry condition being determined to be satisfied, the performed one of the following traveling mode and the constant-speed traveling mode to a crossing mode that controls traveling of the own vehicle to ensure a predetermined mined space in front of the own vehicle, the predetermined space enabling the at least one other crossing vehicle to cross in front of the own vehicle.

The above configuration of the vehicle control apparatus, which switches, upon the entry condition being determined to be satisfied, the performed one of the following traveling mode and the constant-speed traveling mode to the crossing mode, enables the at least one other crossing vehicle to safely cross in front of the own vehicle.

The present disclosure can be implemented by various aspects. For example, the present disclosure can be implemented by a method of controlling a vehicle, a program product for causing a computer to perform such a method, and a vehicle installing therein such a vehicle control apparatus.

First Embodiment

The following describes a vehicle control apparatus 20 according to the first embodiment; the vehicle control apparatus 20 is applied to regions having traffic regulations in which drivers drive on the left.

Referring to FIG. 1, an own vehicle 10 includes a forward monitoring sensor 12, a sideward monitoring sensor 14, a position sensor 16, a vehicle speed sensor 18, and the vehicle control apparatus 20. The own vehicle 10 additionally includes an engine ECU 41, a brake ECU 42, a steering ECU 43, an engine 44, a brake mechanism 45, and a steering mechanism 46.

Each of the sensors 12, 14, and 16 is configured to be communicable with the vehicle control apparatus 20, and to transmit, to the vehicle control apparatus 20, detected information.

The forward monitoring sensor 12 is comprised of various sensors for detecting objects located in front of the own vehicle 10. The sideward monitoring sensor 14 is comprised of various sensors for detecting objects located on either side of the own vehicle 10.

Each of the forward monitoring sensor 12 and sideward monitoring sensor 14 includes, for example, an image sensor, such as a camera, a radio-wave sensor, a lidar, i.e. a laser radar, and a sound-wave sensor.

The radio-wave sensor is configured to emit radio waves, such as millimeter waves, and detect echo radio waves resulting from reflection of the emitted radio waves. The lidar is configured to emit laser light, and detect light resulting from reflection of the emitted laser light. The sound-wave sensor is configured to emit sound waves, and detect echo sound waves resulting from reflection of the emitted sound waves. Note that each of the forward monitoring sensor 12 and sideward monitoring sensor 14 can be comprised of at least one of the various sensors or another sensor as long as the corresponding one of the sensors 12 and 14 is capable of detecting objects located in front of or on either side of the own vehicle 10.

The position sensor 16 is configured to detect a current position of the own vehicle 10. For example, the position sensor 16 is comprised of a receiver that receives, via one or more antennas, global positioning system (GPS) signals, which are sent from GPS satellites constituting a global navigation satellite system (GNSS).

The vehicle speed sensor 18 is configured to detect a speed of the own vehicle 10.

The vehicle control apparatus 20 includes a surrounding object detector 21, an enterable space determiner 22, a preceding vehicle determiner 25, an other vehicle determiner 26, an entry determiner 28, and an autonomous driving controller 29.

The surrounding object detector 21 is configured to obtain information detected by the forward monitoring sensor 12 and/or the sideward monitoring sensor 14, and obtain information detected by the position sensor 16. The surrounding object detector 21 is configured to perform, based on the objected pieces of information, detection of at least one object located around the own vehicle 10. Detection of at least one object located around the own vehicle 10 includes 1. Determination of whether there is at least one object located around the own vehicle 10
2. Detection of a distance, i.e. relative position, of at least one object relative to the own vehicle 10
3. Detection of a speed, i.e. a relative speed, of at least one object relative to the own vehicle 10

The enterable space determiner 22 is configured to determine whether at least one enterable space SP is situated in accordance with (i) information, i.e. object information, obtained by the surrounding object detector 21, (ii) information about lanes detected by the forward monitoring sensor 12, and (iii) information about the current position of the own vehicle 10 detected by the position sensor 16.

The at least one enterable space SP represents at least one space that is located in front of the own vehicle 10 traveling on a lane, and that is located on a branching portion from the lane on which the own vehicle 10 is traveling; the lane on which the own vehicle 10 is traveling will be referred to as a travel lane.

In regions having traffic regulations in which drivers drive on the left, the at least one enterable space SP is at least one space located on a branching portion on the left side of the travel lane. The at least one enterable space SP includes, for example, one or more other lanes crossing the travel lane, one or more parking areas, and one or more side roads.

For example, let us assume that a guardrail is located on the left side of the travel lane. In this assumption, the surrounding object detector 21 detects, based on the information obtained from the sound-wave sensor of the sideward monitoring sensor 14, change from a first situation where there are echo sound waves to a second situation where there are no echo sound waves. In response to the detection of the change, the enterable space determiner 22 determines that an entrance of at least one enterable space SP is located at a region where there are no echo sound waves.

In the above assumption, the enterable space determiner 22 can determine whether at least one enterable space SP is situated in accordance with an image obtained from the surrounding object detector 21; the image is captured by the camera of the sideward monitoring sensor 14.

The preceding vehicle determiner 25 is configured to determine, based on information detected by the surrounding-object detector 21, whether there is a preceding vehicle traveling on the travel lane of the own vehicle 10 in front of the own vehicle 10. For example, the preceding vehicle determiner 25 is configured to determine whether there is a preceding vehicle in accordance with (i) information about lanes detected by the forward monitoring sensor 12, and (ii) a result of pattern matching among vehicles included in one or more images captured by the forward monitoring sensor 12. Note that a preceding vehicle is a vehicle traveling on the travel lane of the own vehicle 10 in front of the own vehicle 10.

The other vehicle determiner 26 is configured to determine whether there is at least one other crossing vehicle that is estimated to cross in front of the own vehicle 10 to thereafter enter the enterable space SP in accordance with information detected by the surrounding-object detector 21 and information detected by the enterable space determiner 22. For example, the other vehicle determiner 26 determines whether there is at least one other crossing vehicle in accordance with information, detected by the surrounding-object detector 21, indicative of how blinkers of one or more other vehicles located in front of and/or on a side of the own vehicle 10 work. How the other vehicle determiner 26 works will be described in detail hereinafter.

The entry determiner 28 is configured to perform, upon the other vehicle determiner 26 determining that there is at least one other crossing vehicle, a determination task of determining whether at least one entry condition is satisfied. In particular, the entry determiner 28 performs the determination task upon the autonomous driving controller 29 performing one of a following traveling mode M1 and a constant-speed traveling mode M2, which will be described later.

The at least one entry condition represents a condition that enables the at least one other crossing vehicle to cross in front of the own vehicle 10 to thereafter enter the at least one enterable space SP without colliding with the own vehicle 10. How the entry determiner 28 determines whether the at least one entry condition is satisfied will be described in detail hereinafter.

The autonomous driving determiner 29 is configured to instruct the engine ECU 41, the brake ECU 42, and/or the steering ECU 43 to perform one of the following traveling mode M1, the constant-speed traveling mode M2, and a crossing mode M3 to thereby autonomously control the own vehicle 10.

The following traveling mode M1 represents a mode that causes the own vehicle 10 to travel following the preceding vehicle traveling in front of the own vehicle 10. The following traveling mode M1 enables the own vehicle 10 to travel while keeping the following distance between the own vehicle 10 and the preceding vehicle to a distance PD that is programmed to increase as the relative speed between the own vehicle 10 and the preceding vehicle increases.

The constant-speed traveling mode M2 represents a mode that causes the own vehicle 10 to travel at a preset constant speed VD.

The crossing mode M3 represents a mode that controls traveling of the own vehicle 10 to thereby ensure a sufficient space in front of the own vehicle 10 upon the at least one entry condition being determined to be satisfied; the sufficient space enables the other crossing vehicle to cross in front of the own vehicle 10.

For example, a driver's operation of operating a selection button mounted to the own vehicle 10 enables the autonomous driving controller 29 to selectively perform the following traveling mode M1 or the constant-speed traveling mode M2. In particular, the autonomous driving determiner 29 according to the first embodiment is configured to perform the following traveling mode M1 upon the preceding vehicle being determined to be located in front of the own vehicle 10, and perform the constant-speed traveling mode M2 upon no preceding vehicle being determined to be located in front of the own vehicle 10.

The engine ECU 41 is configured to control operations of the engine 44.

Specifically, the engine ECU 41 is configured to control various actuators of the engine 44 to thereby control 1. An open or close operation of a throttle valve of the engine 44
2. An ignition operation by each igniter of the engine 44
3. An open or close operation of each intake valve of the engine 44

The brake system 45 includes various sensors and actuators; these actuators include motors, valves, and pumps, which are used to control braking of the own vehicle 44.

The brake ECU 42 is configured to

1. Determine a braking timing and a predetermined amount of braking
2. Control each of the actuators to thereby slow down the own vehicle 10 based on the determined amount of braking at the determined braking timing The steering ECU 43 controls operations of the steering mechanism 46.

The steering mechanism 46 includes one or more actuators, such as a power steering motor, used to steer the steering wheel.

The steering ECU 43 is configured to determine assist steering torque or an assist steering angle based on instructions sent from the autonomous driving controller 29, and control the one or more actuators to thereby generate the assist steering torque.

Note that the own vehicle 10 according to the first embodiment is configured to be driven by the engine 44, but can be configured to be driven by one or more electric motors.

Next, the following describes, with reference to FIGS. 2 to 10, the sequence of control operations carried out by the vehicle control apparatus 20 after the autonomous driving controller 29 is instructed to perform autonomous driving of the own vehicle 10.

FIGS. 5 to 10 schematically illustrate respective situations in each of which the own vehicle 10 is located on a travel lane Ln1, and an intersection CP is located in front of the own vehicle 10. In each of the situations respectively illustrated in FIGS. 5 to 10, an oncoming lane Ln2, which is opposite to the travel lane Ln1, and a travel lane Ln3 crossing to be perpendicular to the travel lane Ln1 are illustrated.

Figure 2:
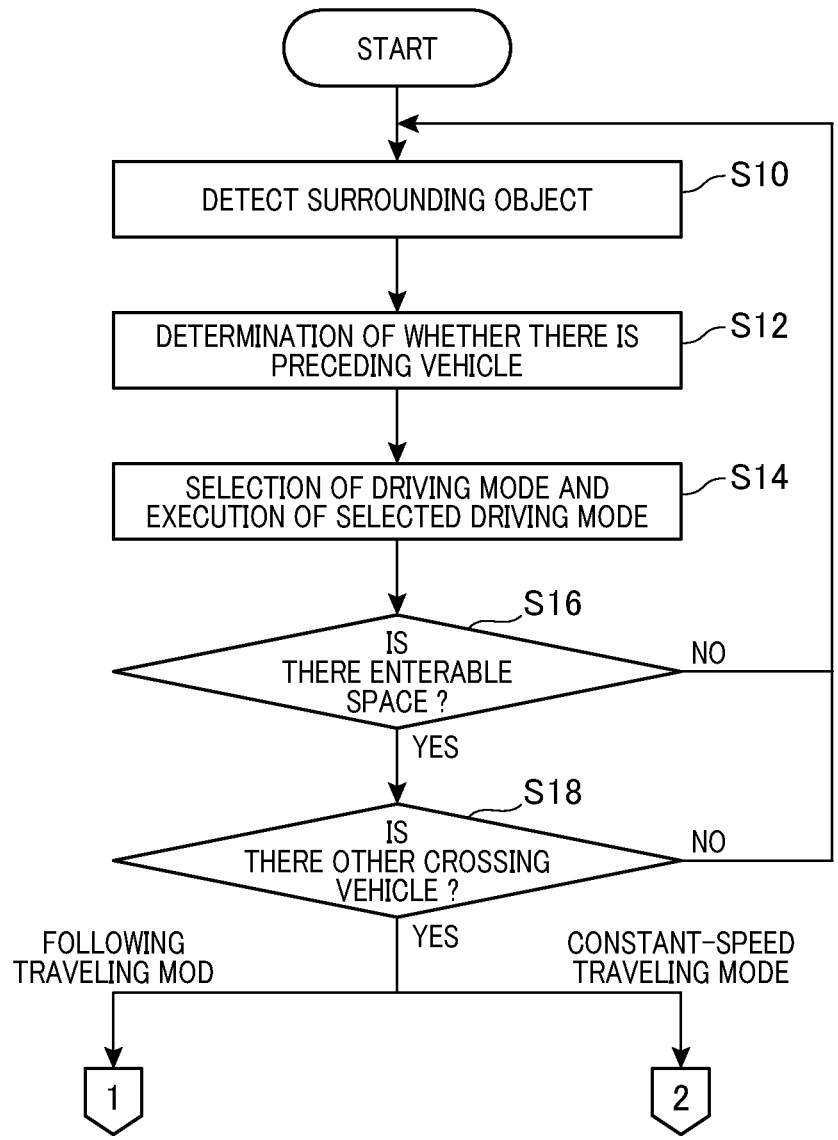
FIG. 2 is a first flowchart carried out by the vehicle control apparatus of the first embodiment.

As illustrated in FIG. 2, the surrounding object detector 21 detects one or more surrounding objects around the own vehicle 10 in accordance with pieces of information obtained from the forward monitoring sensor 12, the sideward monitoring sensor 14, and/or the position sensor 16 in step S10.

Next, the preceding vehicle determiner 25 determines, based on the information detected by the surrounding-object detector 21, whether there is a preceding vehicle (see reference numeral 55 in FIGS. 5 to 10) traveling on the travel lane Ln1 in front of the own vehicle 10 in step S12.

Subsequently, the autonomous driving controller 29 selects one of the following traveling mode M1 and the constant-speed traveling mode M2 in accordance with the determination of whether there is a preceding vehicle 55 in front of the own vehicle 10, and performs the selected one of the following traveling mode M1 and the constant-speed traveling mode M2 in step S14.

Specifically, the autonomous driving controller 29 selects the following traveling mode M1 upon determining that there is a preceding vehicle 55 in front of the own vehicle 10, thus performing the following traveling mode M1 in step S14, or selects the constant-speed traveling mode M2 upon determining that there is not a preceding vehicle in front of the own vehicle 10, thus performing the constant-speed traveling mode M2 in step S14.

Next, in step S16, the enterable space determiner 22 determines whether at least one enterable space SP is availably situated. In the first situation illustrated in FIG. 5, the enterable space determiner 22 determines that the enterable space SP that is located on a branching portion on the left side of the travel lane Ln1 of the own vehicle 10 is availably situated (YES in step S16). The enterable space SP illustrated in FIG. 5 constitutes the travel lane Ln3 crossing to be perpendicular to the travel lane Ln1. Otherwise, the vehicle controller 20 repeats the sequence illustrated in FIG. 2 from the operation in step S10 upon the enterable space determiner 22 determining that there are no available enterable spaces SP (NO in step S16).

Following the affirmative determination in step S16, the other vehicle determiner 26 deter mines whether there is at least one of a first other crossing vehicle 60 and a second other crossing vehicle 65 in step S18.

Figure 5:
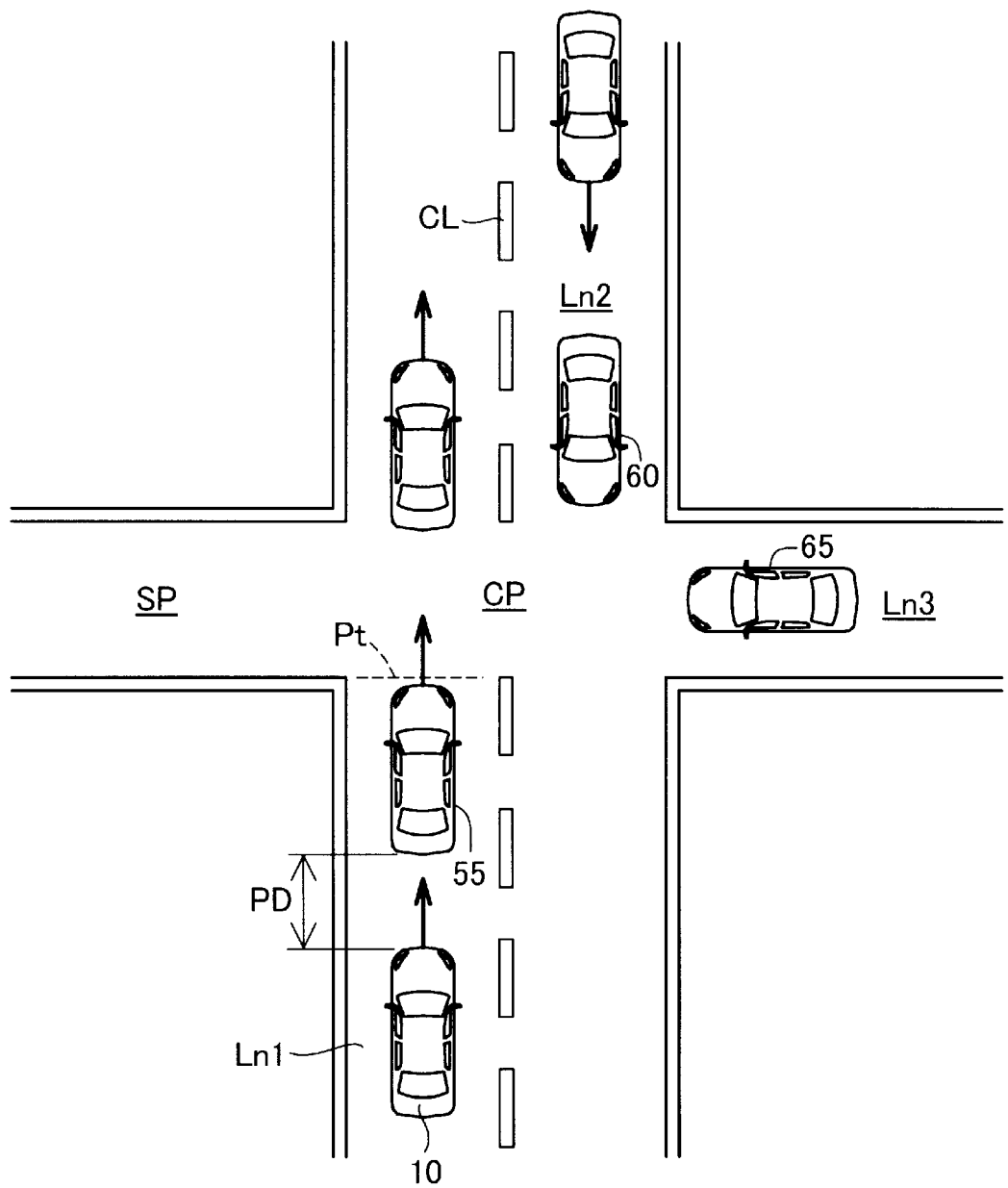
FIG. 5 is a first diagram schematically illustrating a first situation where first predetermined control operations of the vehicle control apparatus of the first embodiment are carried out.

The following describes how the other vehicle determiner 26 determines whether there is at least one of a first other crossing vehicle 60 and a second other crossing vehicle 65 using FIG. 5.

Specifically, in the situation where a target vehicle is present on the travel lane Ln3 crossing to be perpendicular to the travel lane Ln1 and is located in the front on the right side of the own vehicle 10, the other vehicle determiner 26 determines that the target vehicle is a second other crossing vehicle 65 upon the following condition 1 being satisfied:

The condition 1 is that the target vehicle is stopped with non-flashing of its direction indicators.

In addition, in the situation where a target vehicle is present on the oncoming lane Ln2 in front of the own vehicle 10, the other vehicle determiner 26 determines that the target vehicle is a first other crossing vehicle 60 upon any one of the following conditions 2 and 3 being satisfied:

The condition 2 is that the target vehicle causes its direction indicator to flash for entering the enterable space SP.

The condition 3 is that the target vehicle is stopped on the oncoming lane Ln2 to be closer to a center line CL.

For example, the other vehicle determiner 26 measures a lateral distance between the target vehicle and the center line CL, and determines whether the measured lateral distance is lower than or equal to a predetermined value. Then, the other vehicle determiner 26 determines that the target vehicle is located to be closer to the center line CL upon determining that the measured lateral distance is lower than or equal to the predetermined value.

The other vehicle determiner 26 can determine that the target vehicle is a first other crossing vehicle 60 upon all the conditions 2 and 3 being satisfied.

As illustrated in FIG. 2, the vehicle control apparatus 20 repeats the sequence illustrated in FIG. 2 from the operation in step S10 upon the other vehicle determiner 26 determining that there are no first and second crossing vehicles (NO in step S18).

Figure 3:
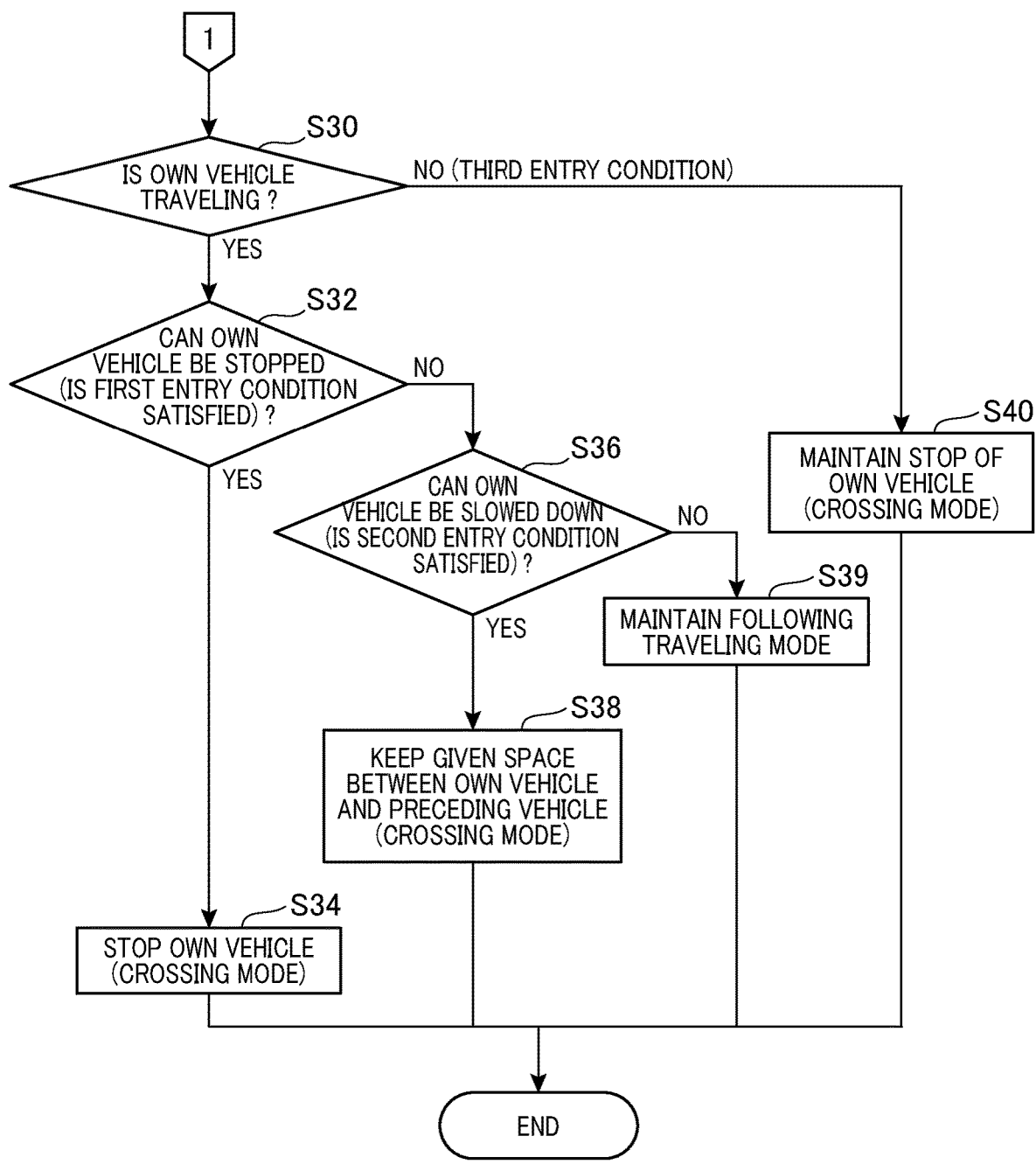
FIG. 3 is a second flowchart carried out by the vehicle control apparatus of the first embodiment.
Figure 4:
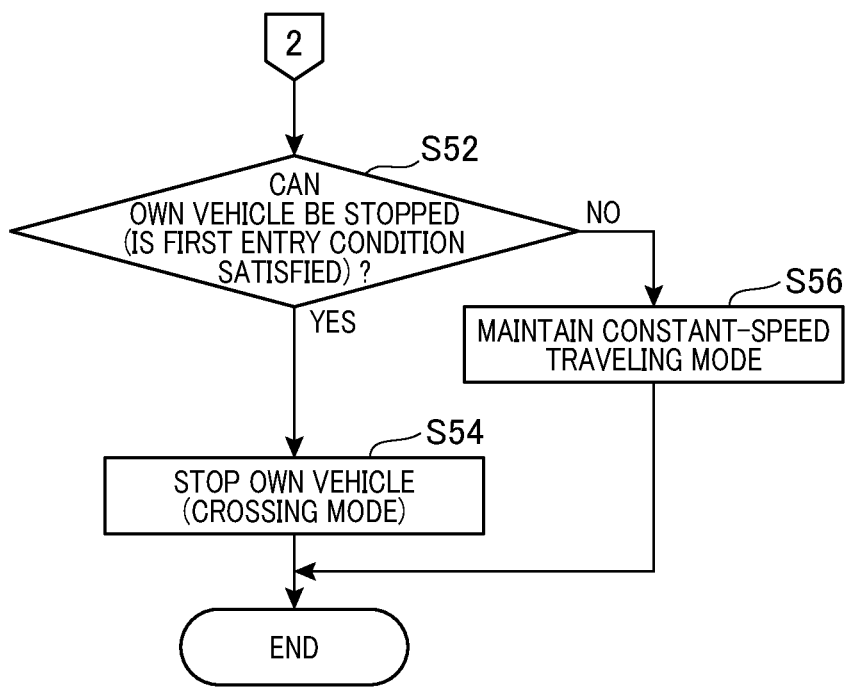
FIG. 4 is a third flowchart carried out by the vehicle control apparatus of the first embodiment.

Otherwise, when the other vehicle determiner 26 determines that there is at least one of a first other crossing vehicle 60 and a second other crossing vehicle 65 (YES in step S18), the autonomous driving controller 29 performs an operation in step S30 in FIG. 3 when performing the following traveling mode M1, or performs an operation in step S52 in FIG. 4 when performing the constant-speed traveling mode M2.

In step S30, the autonomous driving controller 29 determines whether the own vehicle 10 is traveling just before the enterable space SP in the following traveling mode M1. As illustrated in FIG. 5, when the autonomous driving controller 29 determines that the own vehicle 10 is traveling just before the enterable space SP in the following traveling mode M1, the entry determiner 28 determines whether at least one of entry conditions are satisfied in steps S32 and S36. Each of the entry conditions represents a condition that the first other crossing vehicle 60 or the second other crossing vehicle 65 can cross in front of the own vehicle 10 to enter the enterable space SP without colliding with the own vehicle 10. The entry conditions include a first entry condition, a second entry condition, and a third entry condition.

In step S32, the entry determiner 28 determines whether the first entry condition is satisfied. The first entry condition is that the brake mechanism 45 is able to stop the own vehicle 10 at a point Pt on the travel lane Ln1; the point Pt is located before the entrance of the enterable space SP. In particular, the entry determiner 28 determines whether the first entry condition is satisfied as long as the own vehicle 10 being slowed down at a predetermined decreasing rate for occupant safety. That is, the first entry condition represents a condition that decreasing of the speed of the own vehicle 10 at the predetermined mined decreasing rate enables the own vehicle 10 to be stopped at the point Pt.

When the first entry condition is satisfied (YES in step S32), the autonomous driving controller 29 switches the running following traveling mode M1 to the crossing mode M3, and performs the crossing mode M3 in step S34. That is, the autonomous driving controller 29 performs the crossing mode M3 in step S34 to thereby instruct the brake ECU 42 to control the own vehicle 10 to be stopped at the point Pt.

This results in the own vehicle 10 being stopped at the point Pt, making it possible for the first other crossing vehicle 60 and/or second other crossing vehicle 65 to cross in front of the own vehicle 10 to enter the enterable space SP safely.

As illustrated in FIG. 3, when the first entry condition is not satisfied (NO in step S32), the autonomous driving controller 29 determines whether the second entry condition is satisfied in step S36.

Figure 6:
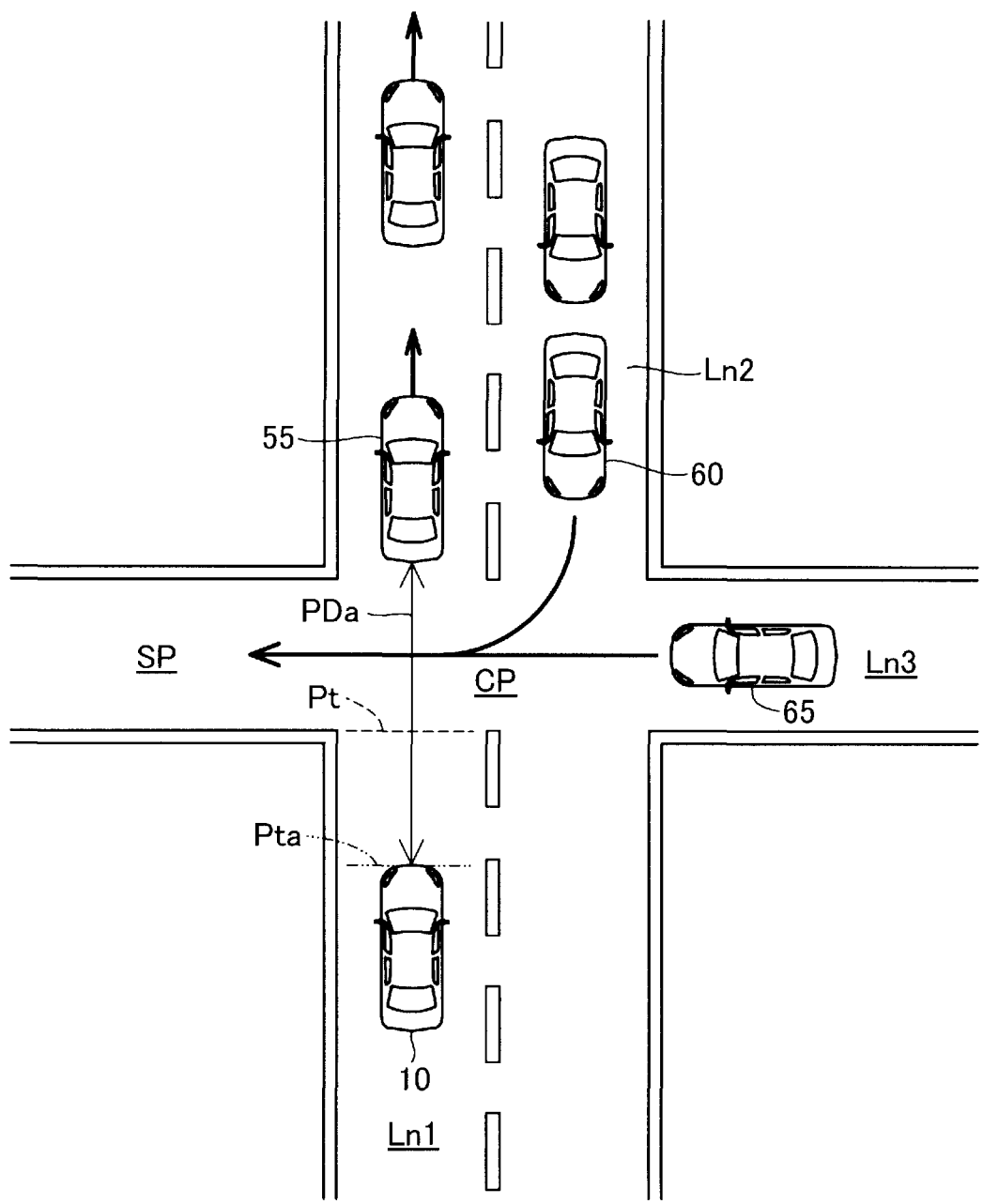
FIG. 6 is a second diagram schematically illustrating a second situation where second predetermined control operations of the vehicle control apparatus of the first embodiment are carried out.

As illustrated in FIG. 6, the second entry condition is that the own vehicle 10 is able to follow the preceding vehicle 55 while keeping a predetermined following distance PDa until the own vehicle 10 is slowed down to reach a point Pta located to be closer to the own vehicle 10 than the point Pt is. The following distance PDa is set to be longer than the following distance PD used by the following traveling mode M1. The following distance PDa is set to enable the first other crossing vehicle 60 or second other crossing vehicle 65 to cross between the preceding vehicle 55 and the own vehicle 10 without colliding with the own vehicle 10.

When the second entry condition is satisfied (YES in step S36), the autonomous driving controller 29 switches the running following traveling mode M1 to the crossing mode M3, and performs the crossing mode M3 in step S38. That is, the autonomous driving controller 29 performs the crossing mode M3 to instruct the brake ECU 42 to control the own vehicle 10, thus setting the following distance between the preceding vehicle 55 and the own vehicle 10 to the distance PDa until the own vehicle 10 reaches the point Pta in step S38. This enables, as illustrated in FIG. 6, the first other crossing vehicle 60 and/or second other crossing vehicle 65 to cross between the preceding vehicle 55 and the own vehicle 10 to enter the enterable space SP safely.

As illustrated in FIG. 3, when both the first and second entry conditions are not satisfied (NO in steps S32 and S36), the autonomous driving controller 29 maintains the following traveling mode M1 in step S39. This prevents the first or second other crossing vehicle 60 or 65 from forcedly crossing in front of the own vehicle 10 to enter the enterable space SP.

In addition, when the autonomous driving controller 29 determines that the own vehicle 10 is stopped without traveling (NO in step S30), the entry determiner 28 determines that the third condition is satisfied. In response to satisfaction of the third condition, the autonomous driving controller 29 switches the following traveling mode M1 to the crossing mode M3, and performs the crossing mode M3 in step S40.

Figure 7:
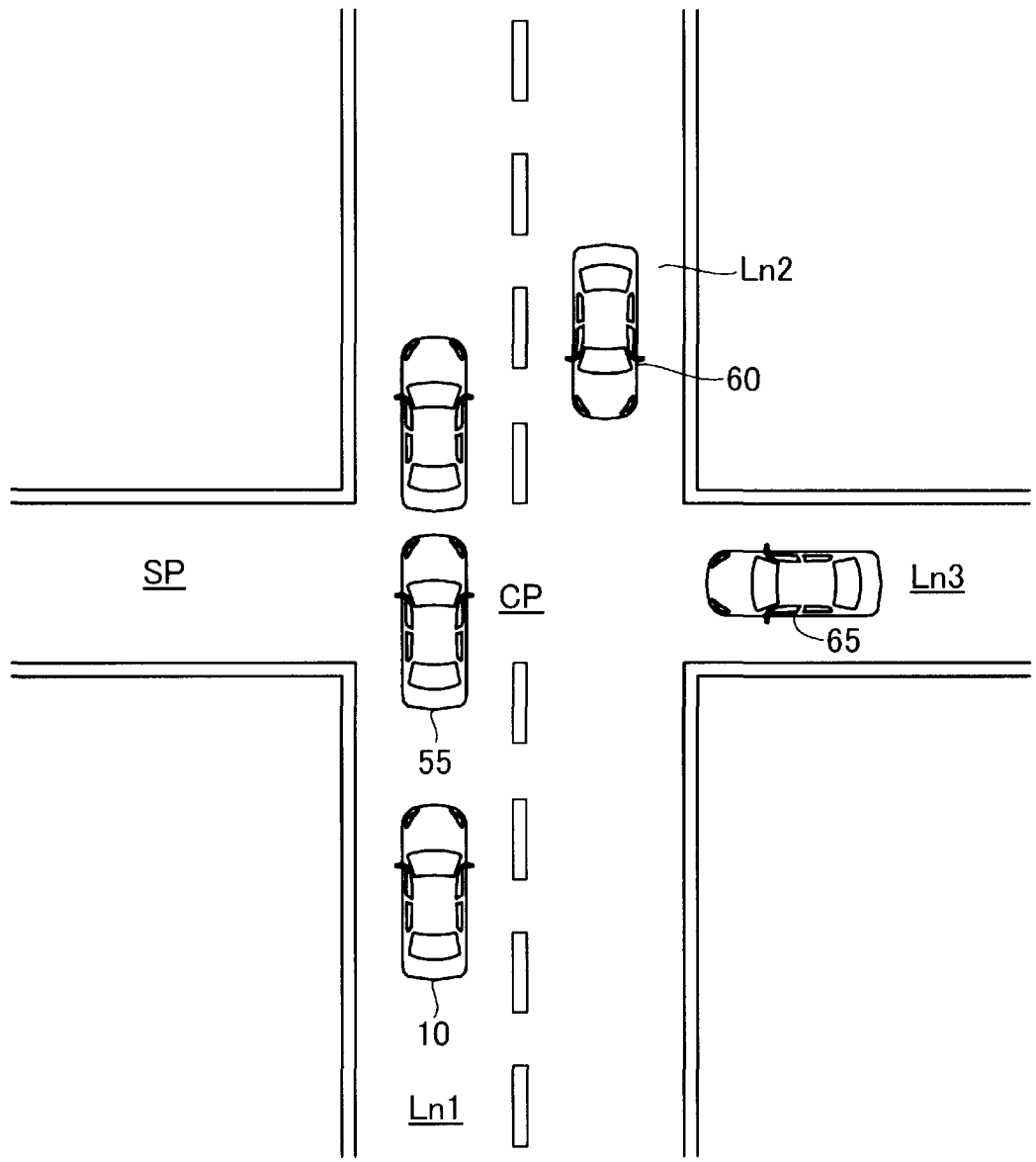
FIG. 7 is a third diagram schematically illustrating a third situation where third predetermined control operations of the vehicle control apparatus of the first embodiment are carried out.
Figure 8:
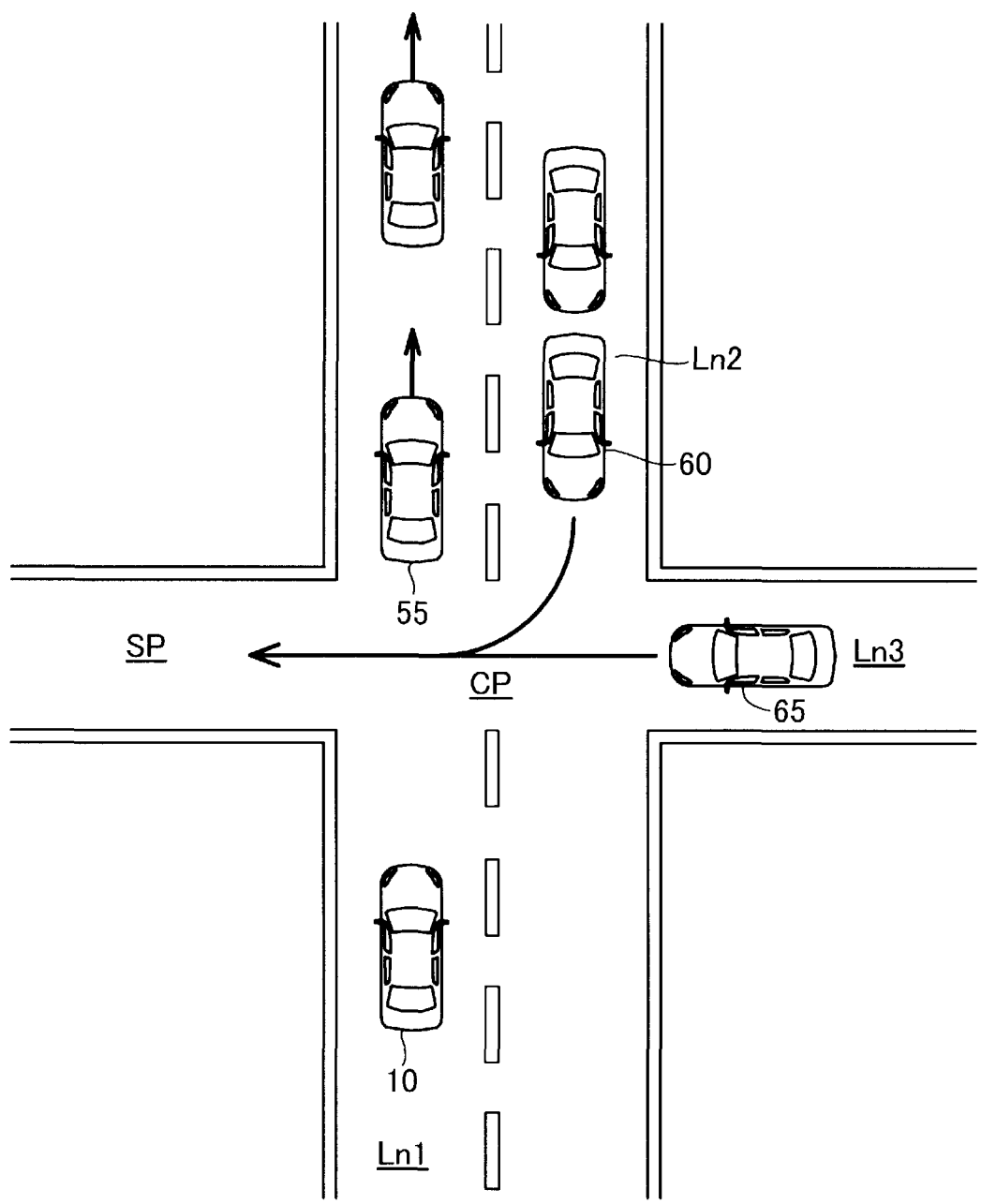
FIG. 8 is a fourth diagram schematically illustrating a fourth situation where fourth predetermined control operations of the vehicle control apparatus of the first embodiment are carried out.

That is, as illustrated in FIGS. 7 and 8, the autonomous driving controller 29 performs the crossing mode M3 in step S40 to thereby maintain the stopped state of the own vehicle 10 independently of starting of the preceding vehicle 55. This makes it possible for the first other crossing vehicle 60 and/or second other crossing vehicle 65 to cross in front of the own vehicle 10 to enter the enterable space SP safely.

Figure 9:
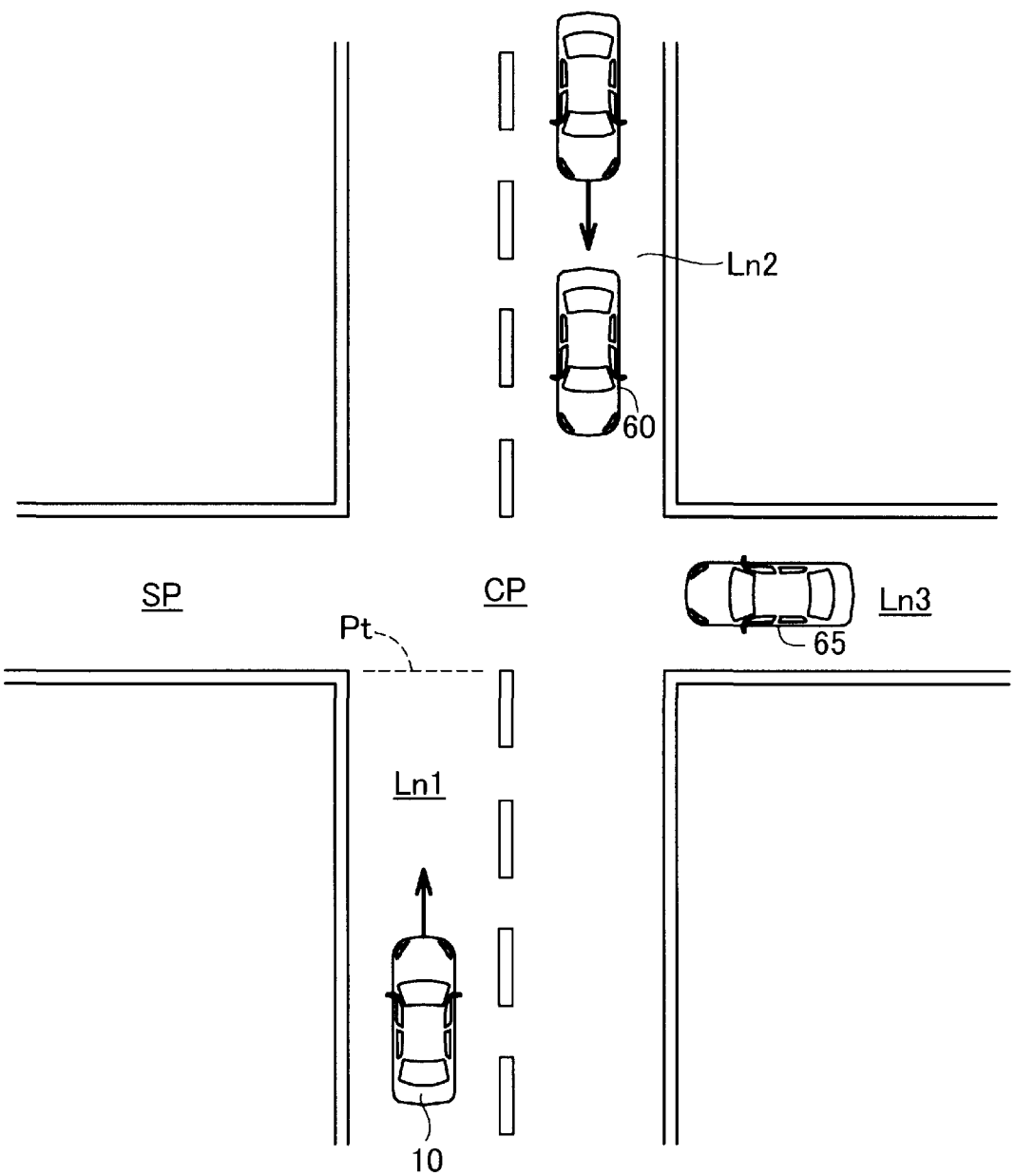
FIG. 9 is a fifth diagram schematically illustrating a fifth situation where fifth predetermined control operations of the vehicle control apparatus of the first embodiment are carried out.

As illustrated in FIG. 9, the autonomous driving controller 29 performs the operation in step S52 in FIG. 4 when performing the constant-speed traveling mode M2 to thereby determine whether the first entry condition is satisfied. The first entry condition is the same as that used in step S32.

When the first entry condition is satisfied (YES in step S52), the autonomous driving controller 29 switches the running constant-speed traveling mode M2 to the crossing mode M3, and performs the crossing mode M3 in step S54. That is, the autonomous driving controller 29 performs the crossing mode M3 in step S54 to thereby instruct the brake ECU 42 to control the own vehicle 10 to be stopped at the point Pt. This results in the own vehicle 10 being stopped at the point Pt, making it possible for the first other crossing vehicle 60 and/or second other crossing vehicle 65 to cross in front of the own vehicle 10 to enter the enterable space SP safely.

Otherwise, as illustrated in FIG. 4, when the first entry condition is not satisfied (NO in step S52), the autonomous driving controller 29 maintains the constant-speed traveling mode M2 in step S56. This prevents the first or second other crossing vehicle 60 or 65 from forcedly crossing in front of the own vehicle 10 to enter the enterable space SP.

After execution of the operation of executing the crossing mode M3 in step S34, S38, or S40, the autonomous driving controller 29 is programmed to terminate the crossing mode M3 in response to detecting the first and/or second other crossing vehicles 60 and/or 65 have crossed in front of the own vehicle 10 based on the information obtained from the forward monitoring sensor 12 and/or sideward monitoring sensor 14.

Second Embodiment

The following describes a vehicle control apparatus 20a according to the second embodiment. Like the first embodiment, the vehicle control apparatus 20a of the second embodiment is also applied to regions having traffic regulations in which people drive on the left. To one or more components of an own vehicle 10a according to the second embodiment, which are identical to those of the own vehicle 10 according to the first embodiment illustrated in FIG. 1, identical reference characters are respectively assigned, so that detailed descriptions of the one or more components are omitted. Similarly, to one or more steps in a sequence of control operations according to the second embodiment, which are identical to those in the sequence of operations according to the first embodiment, identical step numbers are respectively assigned, so that detailed descriptions of the one or more steps are omitted.

Figure 10:
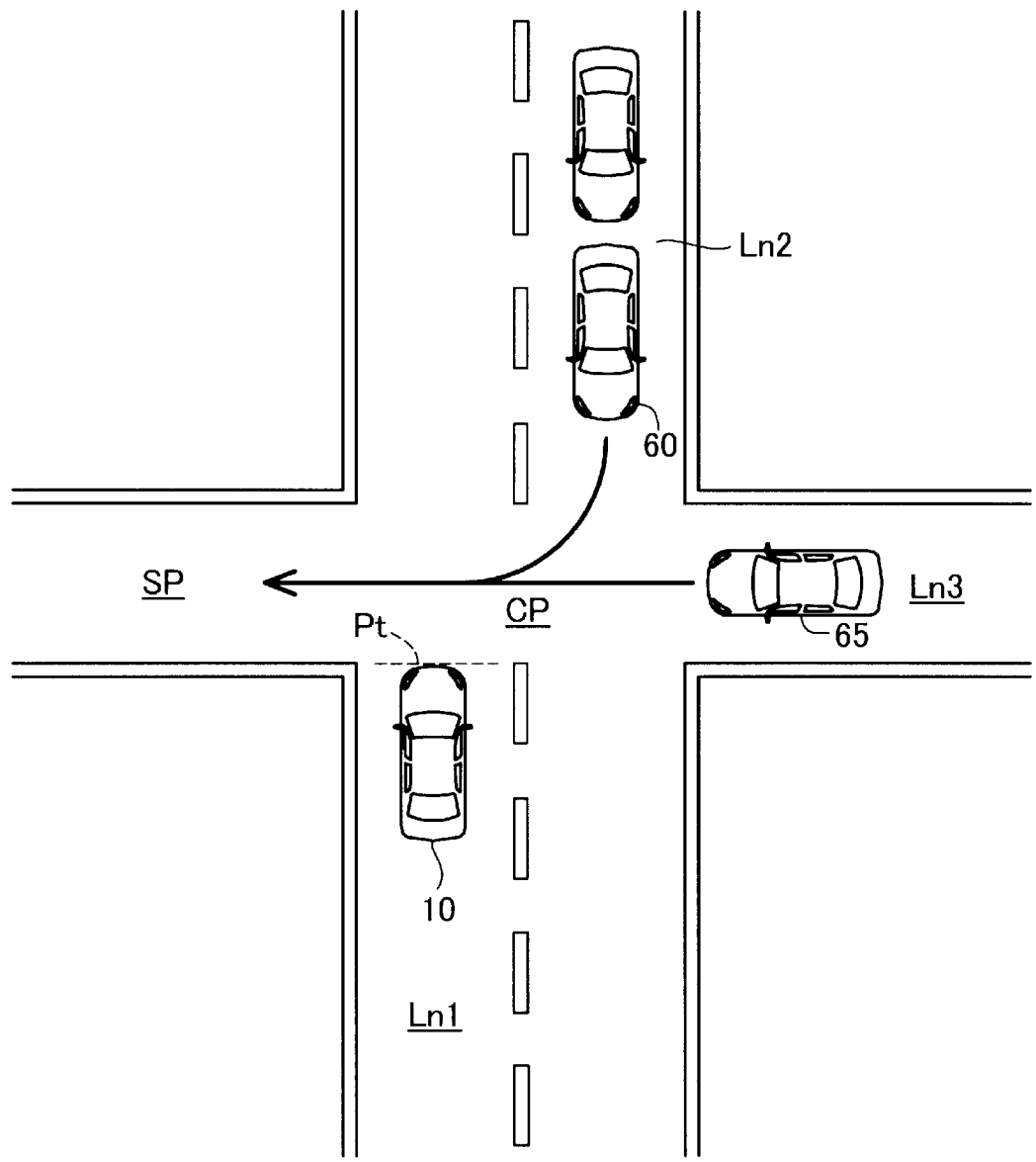
FIG. 10 is a sixth diagram schematically illustrating a sixth situation where sixth predetermined control operations of the vehicle control apparatus of the first embodiment are carried out.
Figure 11:
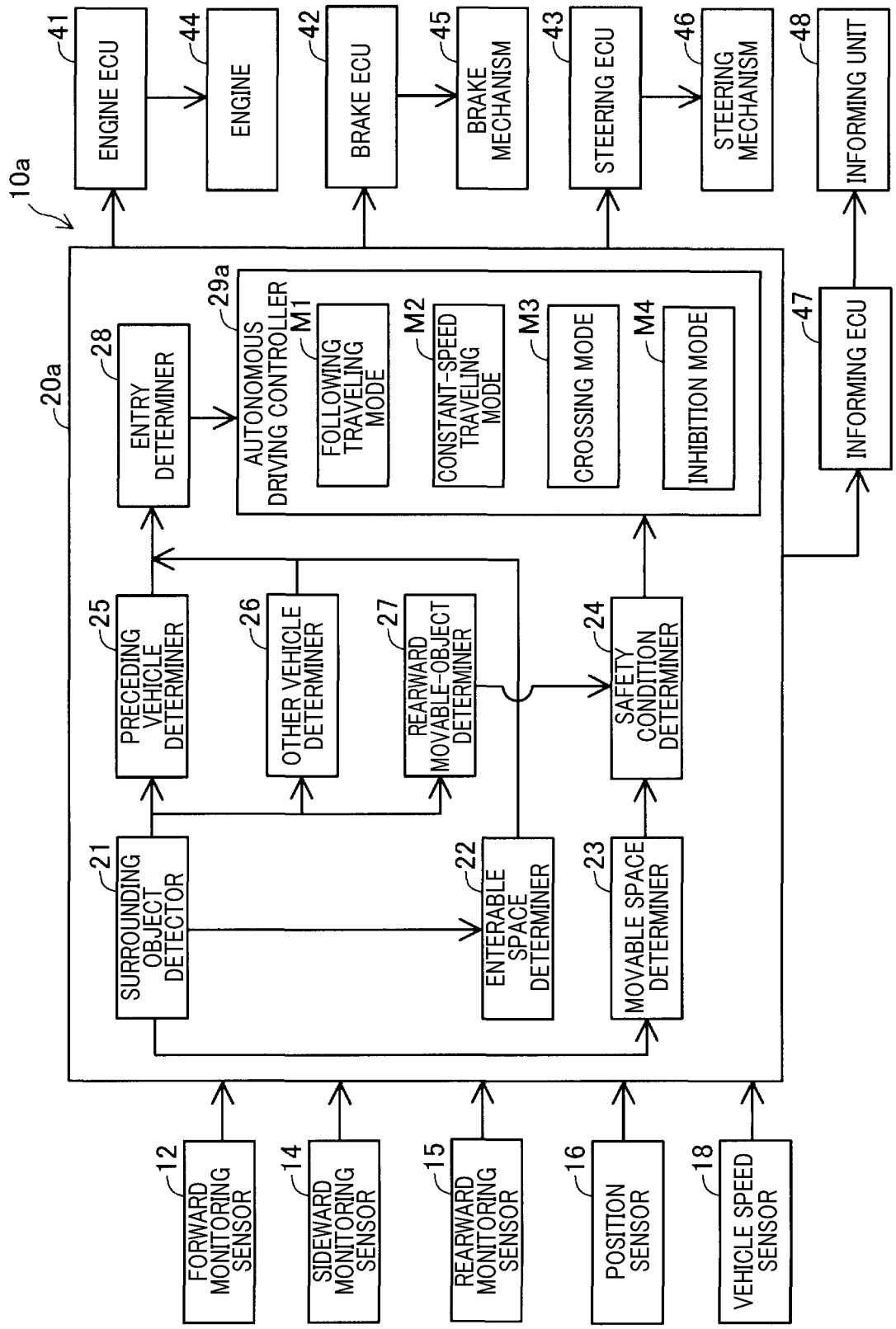
FIG. 11 is a block diagram of an own vehicle including a vehicle control apparatus according to the second embodiment.

Referring to FIG. 10, the own vehicle 10a, in which the vehicle control apparatus 20a is installed, includes a rearward monitoring sensor 15, an informing ECU 47, and an informing unit 48 in addition to the components 12, 14, 16, 18, 20, 41, 42, 43, 45, and 46.

The rearward monitoring sensor 15 is comprised of various sensors for detecting objects located posterior to the own vehicle 10a. The rearward monitoring sensor 15 is comprised of various sensors for detecting objects located on either side of the own vehicle 10.

The rearward monitoring sensor 15 includes, for example, an image sensor, such as a camera, a radio-wave sensor, a lidar, i.e. a laser radar, and a sound-wave sensor. Note that the rearward monitoring sensor 15 can be comprised of at least one of the various sensors or another sensor as long as the rearward sensor 15 is capable of detecting objects located posterior to the own vehicle 10a.

The informing ECU 47 is configured to control operations of the informing unit 48.

The informing unit 48 includes one or more indicator lamps disposed to the front of the own vehicle 10a, and one or more indicator lamps disposed to the rear of the own vehicle 10a.

The informing unit 48 instructs the one or more indicator lamps disposed to the front of the own vehicle 10a to be turned on or to flash to accordingly inform a first other crossing vehicle 60 and/or a second crossing vehicle 65, which are located in front of the own vehicle 10a, about the presence of a rearward movable object 82.

The indicator unit 48 also instructs the one or more indicator lamps disposed to the rear of the own vehicle 10a to be turned on or to flash to accordingly inform in the rearward movable object 82 about the presence of a first other crossing vehicle 60 and/or a second crossing vehicle 65.

Note that the informing unit 48 is not limited to these indicator lamps, and can be configured to display messages and/or output sound to thereby inform the rearward movable object 82 about the presence of a first other crossing vehicle 60 and/or a second other crossing vehicle 65.

The vehicle control apparatus 20a additionally includes a movable space determiner 23, a safety condition determiner 24, and a rearward movable object determiner 27.

The movable space determiner 23 is configured to determine whether there is a movable space MS in a travel lane Ln1 within the range from the location of the own vehicle 10a to the point Pt; the movable space MS represents a space in the travel lane Ln1 where the own vehicle 10a is able to pull over to a closer side of the travel lane Ln1. The closer side of the travel lane Ln1 is one of the both opposite sides of the travel lane Ln1 closer to the enterable space SP than the other of the both opposite sides thereof.

Figure 12:
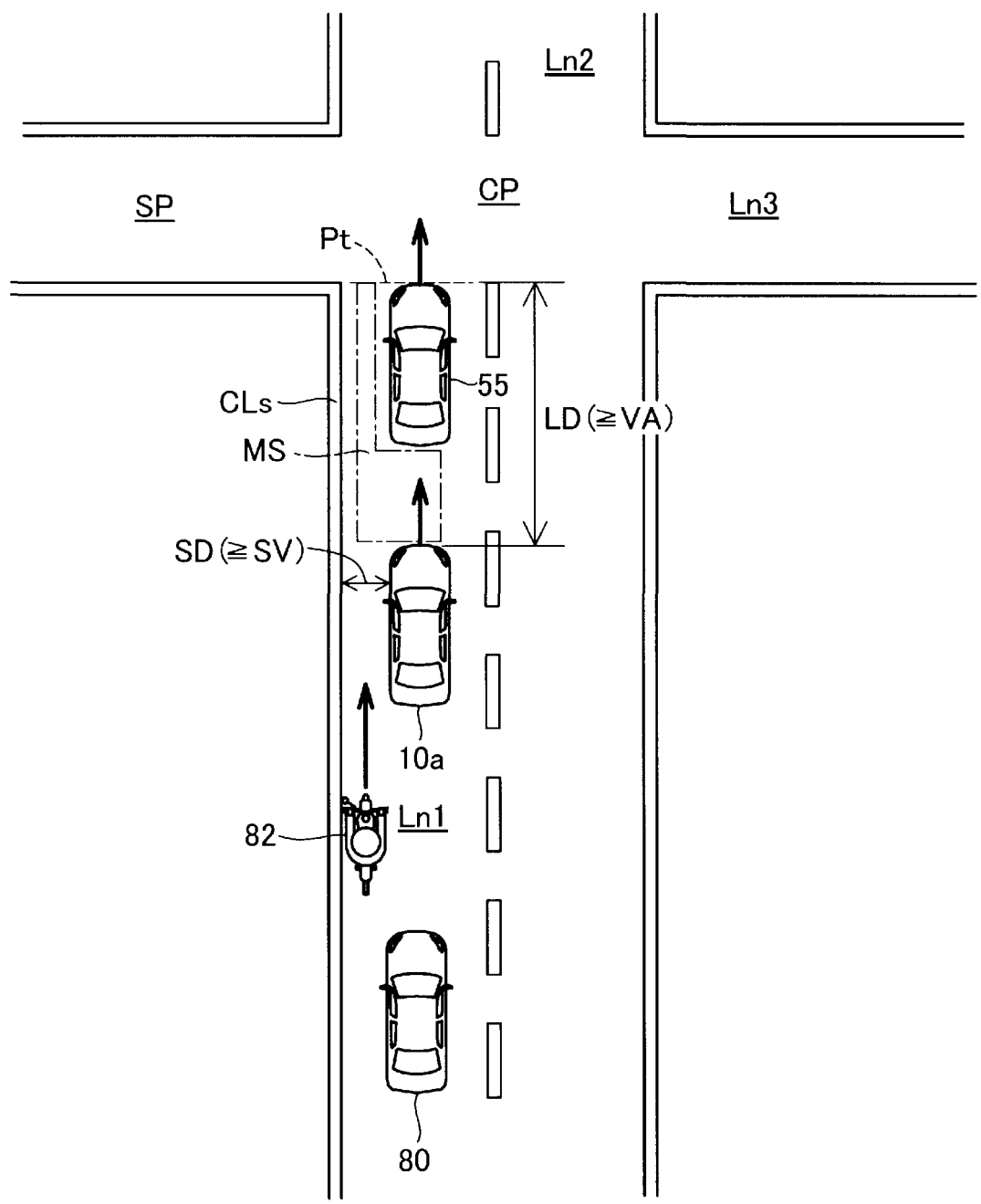
FIG. 12 is a diagram schematically illustrating a movable space and a rearward movable object.

Specifically, as illustrated in FIG. 12, the movable space determiner 23 determines that there is a movable space MS in the travel lane Ln upon the following conditions A and B being satisfied:

The condition A is that, in the travel lane, there is a region LD, located at the front left of the own vehicle 10a, where no objects are present; the region LD is defined as a region whose distance LD from the front of the own vehicle 10a to the point Pt along the travel lane Ln1 is longer than or equal to a predetermined threshold distance VA.

The condition B is that a minimum lateral distance SD between a lane marking CLs and the own vehicle 10a is longer than or equal to a predetermined reference distance SV; the lane marking CLs represents a marking line that partitions the closer side edge of the travel lane Ln1, which is closer to the enterable space SP than the opposite side edge is.

The predetermined threshold distance VA is set to be longer or equal to an estimated distance of the own vehicle 10a; the estimated distance represents a distance at which the own vehicle 10a is estimated to travel within the time period from the start of execution of an inhibition mode M4 described later to the complete of execution of the inhibition mode M4.

The predetermined reference distance SV is set to, for example, 1.0 meters, corresponding to the width of a rearward movable object 82, such as a motorcycle or bicycle, which can pass through either side of the own vehicle 10a. The reference distance SV is not limited to correspond to the width of a rearward movable object 82, and can be set to one-and-a-half times or two times as large as the width of a rearward movable object 82. The rearward movable object determiner 27 is configured to determine, based on information detected by the surrounding-object detector 21 and information detected by the enterable space determiner 22, whether there is at least one rearward movable object 82 in one or more other movable objects 80, 82 (see FIG. 12). The at least one rearward movable object 82 is defined as a movable object that is traveling behind the own vehicle 10a and is capable of passing through the closer side space of the own vehicle 10a, which is closer to the enterable space SP than the other opposite side is. For example, the closer side space of the own vehicle 10a according to the second embodiment is the left side space of the own vehicle 10a.

That is, the rearward movable object determiner 27 is configured to determine that there is at least one rearward movable object 82 when a motor cycle or a bicycle is traveling behind the own vehicle 10a.

The safety condition determiner 24 is configured to determine whether a safety condition is satisfied; the safety condition is a condition that a time to collision (TTC) between the own vehicle 10a and a rearward movable object 82 is larger than or equal to a predetermined threshold time VT. The predetermined threshold time VT is set to a time that enables a rearward movable body 82 to be avoided from colliding with the own vehicle 10a when an autonomous driving controller 29a performs the inhibition mode M4.

The autonomous driving controller 29a is capable of additionally performing the inhibition mode M4.

The inhibition mode M4 represents a mode that causes the own mode 10a to (i) move toward the closer side of the travel lane Ln1, which is closer to the enterable space SP than the other opposite side thereof is, and (ii) be stopped at a given distance short of the enterable space SP. In particular the inhibition mode M4 causes the own vehicle 10a to continuously move toward the closer side of the travel lane Ln1 until the lateral distance SD (see FIG. 12) reaches a predetermined distance PV. The predetermined distance PV can be set to be the same as the reference distance SV or to be a longer distance or a shorter distance.

Figure 13:
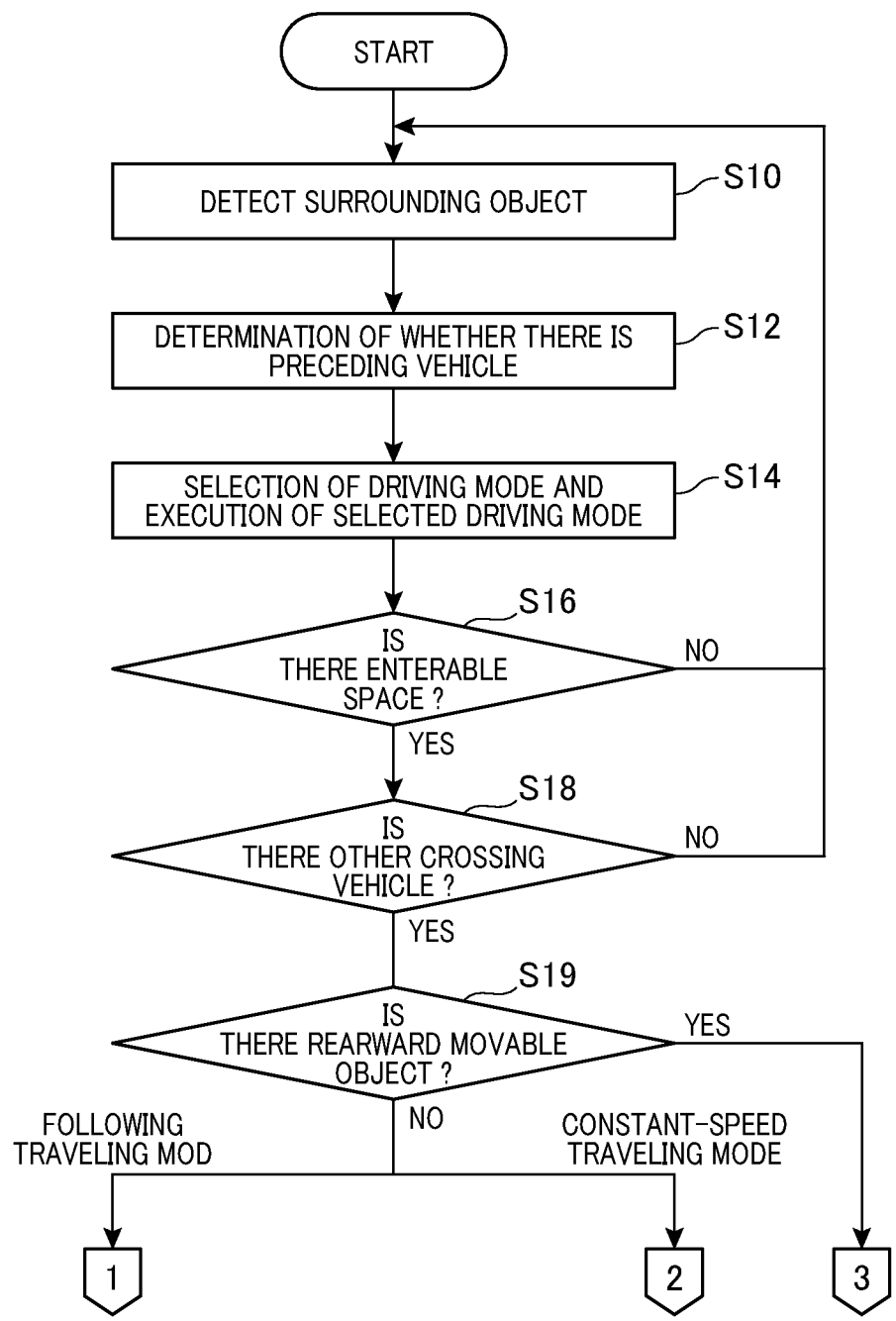
FIG. 13 is a first flowchart carried out by the vehicle control apparatus of the second embodiment.

Specifically, following the affirmative determination in step S18 set forth above, the autonomous driving controller 29a determines whether there is at least one rearward movable object 82 located behind the own vehicle 10a in step S19 of FIG. 13.

When it is determined that there are no rearward movable objects 82 located behind the own vehicle 10a (NO in step S19), the autonomous driving controller 29a performs the operation in step S30 in FIG. 3 when performing the following traveling mode M1, or performs the operation in step S52 in FIG. 4 when performing the constant-speed traveling mode M2.

Figure 14:
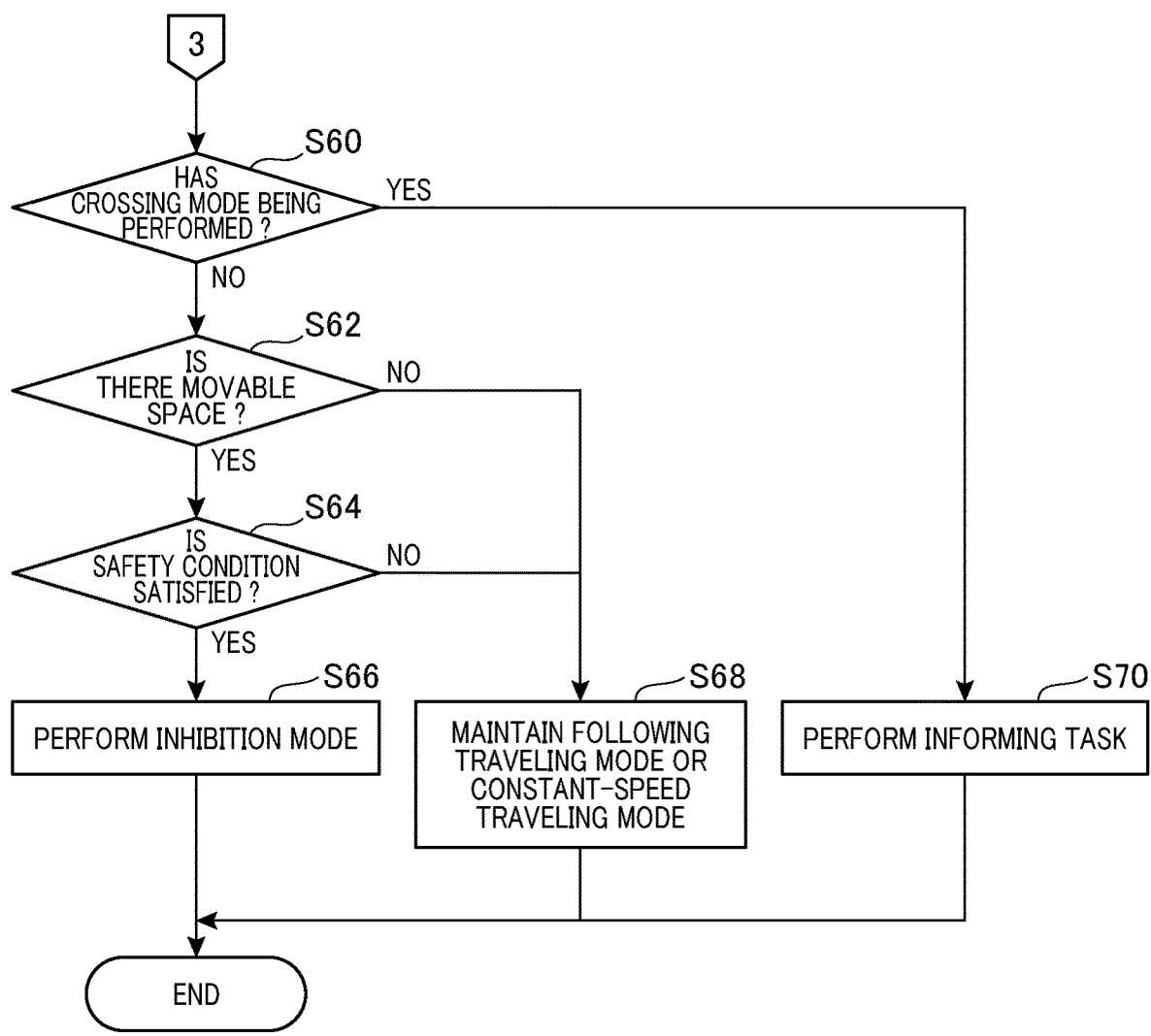
FIG. 14 is a second flowchart carried out by the vehicle control apparatus of the second embodiment.

Otherwise, as illustrated in FIG. 14, when it is determined that there is at least one rearward movable object 82 located behind the own vehicle 10a (YES in step S19), the autonomous driving controller 29a determines whether the autonomous driving controller 29a has been performing any one of the crossing mode M3 in step S34 (see FIG. 3), the crossing mode M3 in step S38 (see FIG. 3), and the crossing mode M3 in step S54 (see FIG. 4) in step S60.

When it is determined that the autonomous driving controller 29a has not been performing any one of the crossing mode M3 in step S34 (see FIG. 3), the crossing mode M3 in step S38 (see FIG. 3), and the crossing mode M3 in step S54 (see FIG. 4) (NO in step S60), the movable space determiner 23 determines whether there is a movable space MS in step S62.

Otherwise, when it is determined that the autonomous driving controller 29a has been performing any one of the crossing mode M3 in step S34 (see FIG. 3), the crossing mode M3 in step S38 (see FIG. 3), and the crossing mode M3 in step S54 (see FIG. 4) (YES in step S60), the autonomous driving controller 29a sends, to the informing ECU 47, an instruction that instructs the informing ECU 47 to activate the informing unit 48 in step S70. This causes the one or more indicator lamps of the informing unit 48 to be turned on or flash, making it possible to
1. Inform at least one occupant in the first other crossing vehicle 60 or the second other crossing vehicle 65 about the presence of the at least one rearward movable object 82, which can collide with the crossing vehicle 60 or 65
2. Inform at least one occupant in the at least one rearward movable object 82 about the presence of the first other crossing vehicle 60 or the second other crossing vehicle 65, which can collide with the at least one rearward movable object 82

When it is determined that there is a movable space MS (YES in step S62), the safety condition determiner 24 determines whether the safety condition is satisfied in step S64.

When it is determined that the safety condition is satisfied (YES in step S64), the autonomous driving controller 29a switches the running following traveling mode M1 or the running constant-speed traveling mode M2 to the inhibition mode M4, and performs the inhibition mode M4 in step S66. This enables the first other crossing vehicle 60 or the second other crossing vehicle 65 to cross in front of the own vehicle 10a, and reduces the possibility of the at least one rearward movable object 82 passing through one side of the own vehicle 10a so as to collide with the first other crossing vehicle 60 or second other crossing vehicle 65.

Otherwise, when it is determined that there are no movable spaces (NO in step S62) or that the safety condition is not satisfied (NO in step S64), the autonomous driving controller 29a continuously performs the following traveling mode M1 or the constant-speed traveling mode M2 in step S68. This reduces the possibility of the at least one rearward movable object 82 colliding with the own vehicle 10a.

Figure 15:
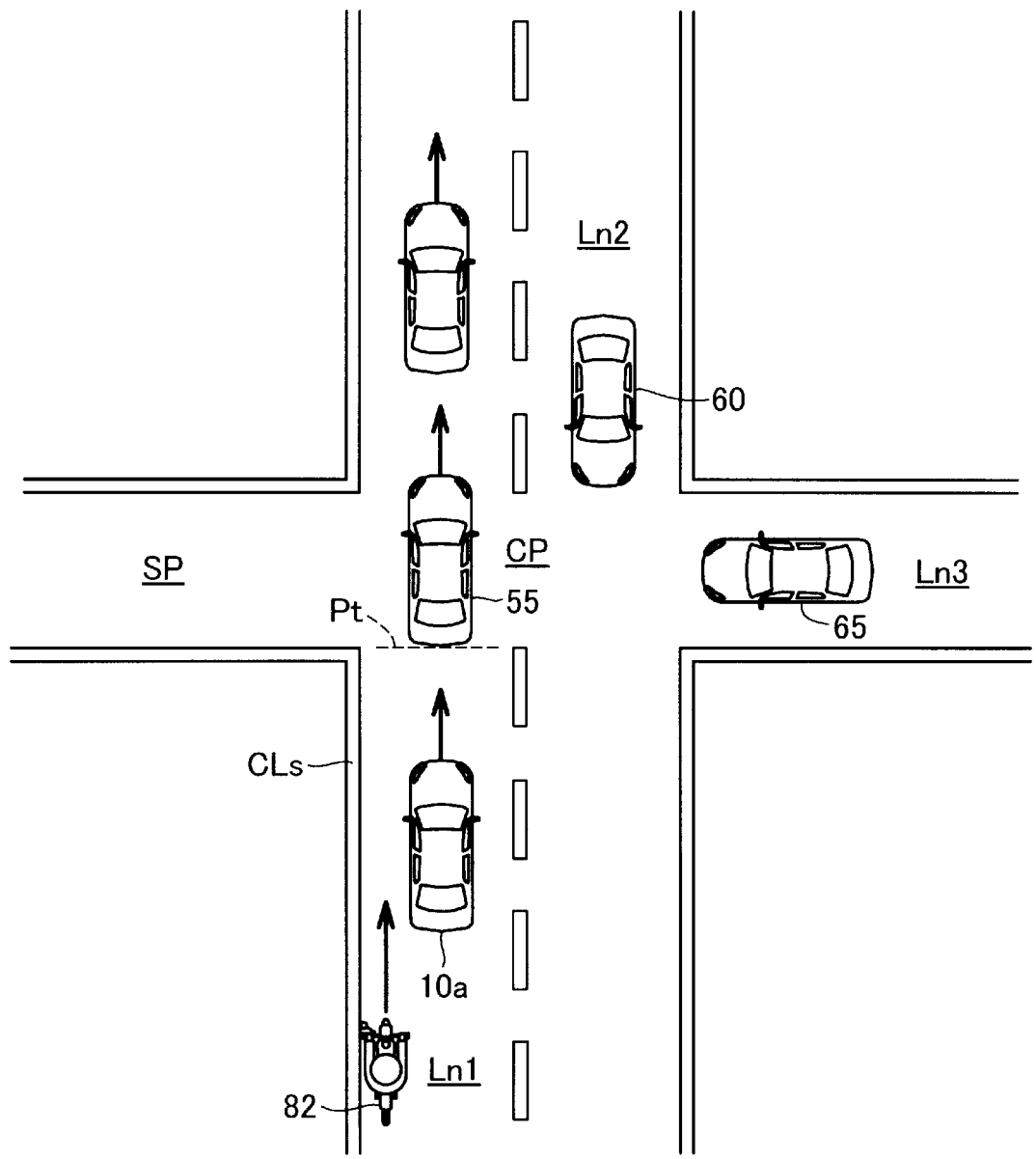
FIG. 15 is a first diagram schematically illustrating a first situation where first predetermined control operations of the vehicle control apparatus of the second embodiment are carried out.

The following describes typical examples of the sequence of the operations carried out by the autonomous driving controller 29a from the operation in step S62 (see FIG. 14) with reference to FIGS. 15 to 22. FIG. 15 schematically illustrates a situation where the own vehicle 10a is traveling at the point Pt or thereabout in the following traveling mode M1 performed by the autonomous driving controller 29a.

Figure 16:
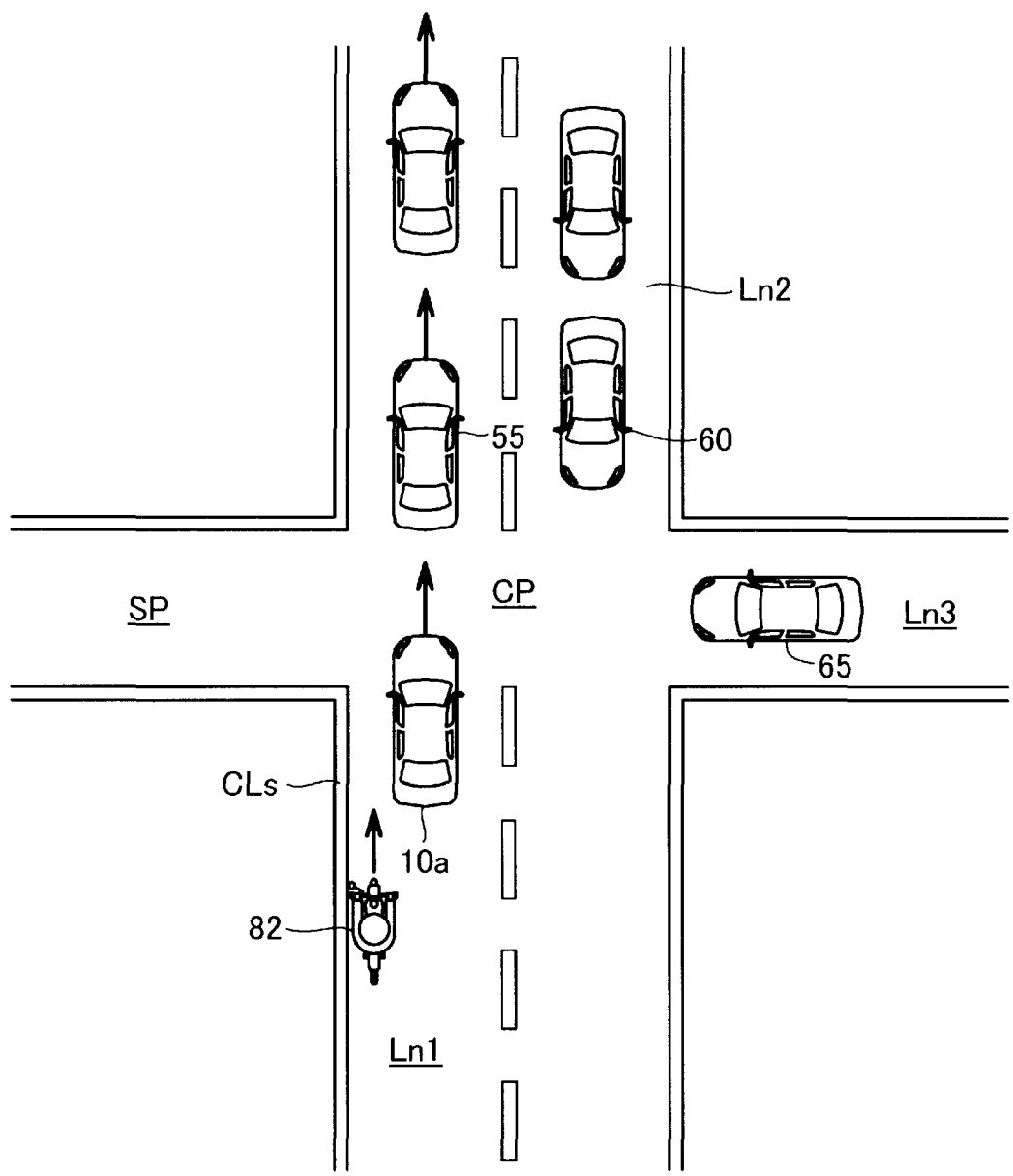
FIG. 16 is a second diagram schematically illustrating a second situation where second predetermined control operations of the vehicle control apparatus of the second embodiment are carried out.

In this situation, the movable space determiner 23 determines that there are no movable spaces MS (NO in step S62), so that the autonomous driving controller 29a continuously performs the following traveling mode M1 without switching the mode M1 to another mode (see step S68) as illustrated in FIG. 16.

Even if it is determined that there is a movable space MS, when the TTC between the own vehicle 10a and the at least one rearward movable object 82 is smaller than the predetermined threshold time VT, the safety condition is not satisfied. This results in the autonomous driving controller 29a continuously performing the following traveling mode M1 without switching the mode M1 to another mode (see step S68).

Figure 17:
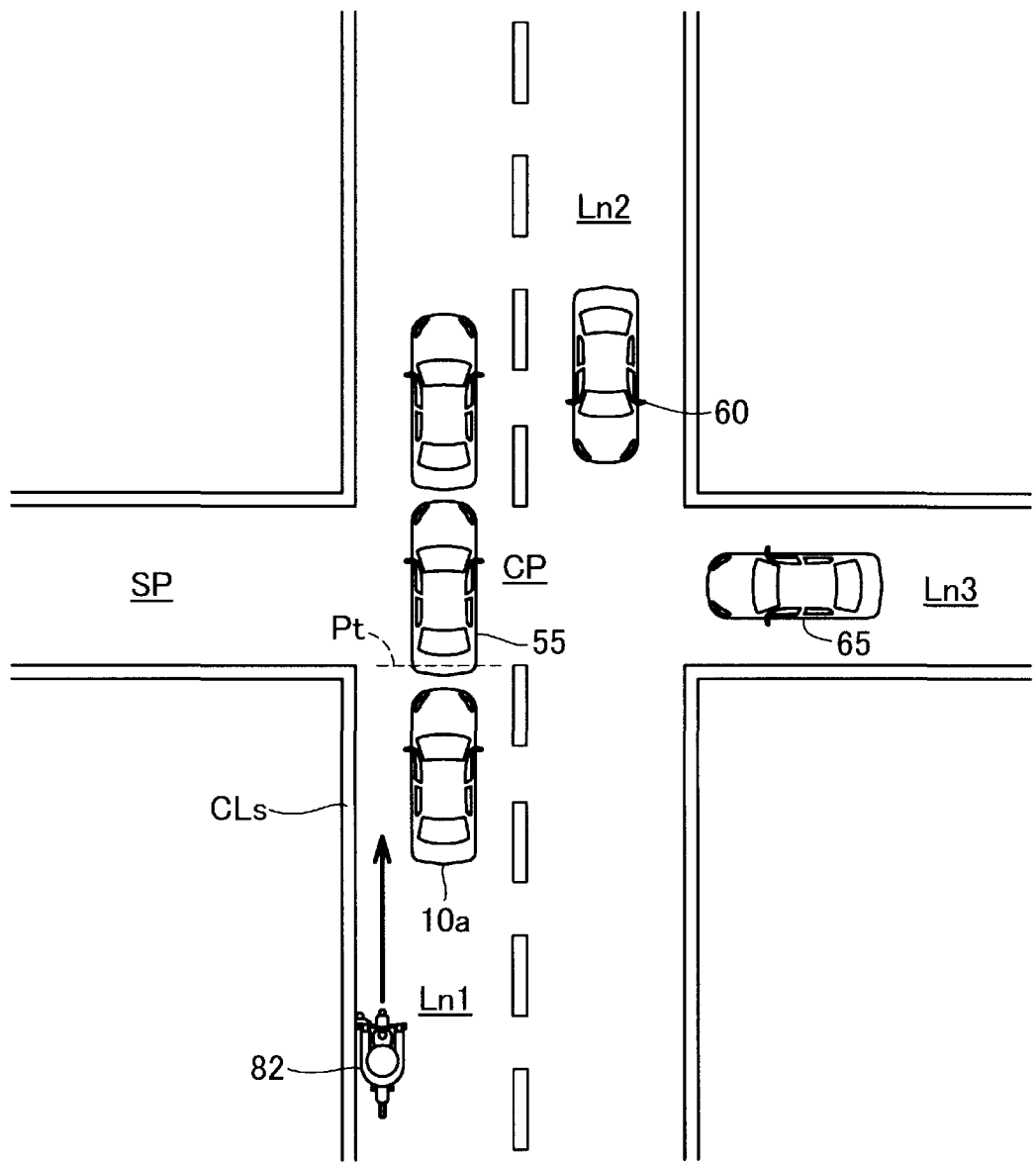
FIG. 17 is a third diagram schematically illustrating a third situation where third predetermined control operations of the vehicle control apparatus of the second embodiment are carried out.

FIG. 17 schematically illustrates a situation where the own vehicle 10a has been stopped following the stop of the preceding vehicle 55 during execution of the following traveling mode M1 in the own vehicle 10a.

In this situation, the movable space deter miner 23 determines that there are no movable spaces MS (NO in step S62), so that the autonomous driving controller 29a continuously performs the following traveling mode M1 without switching the mode M1 to another mode (see step S68).

Figure 18:
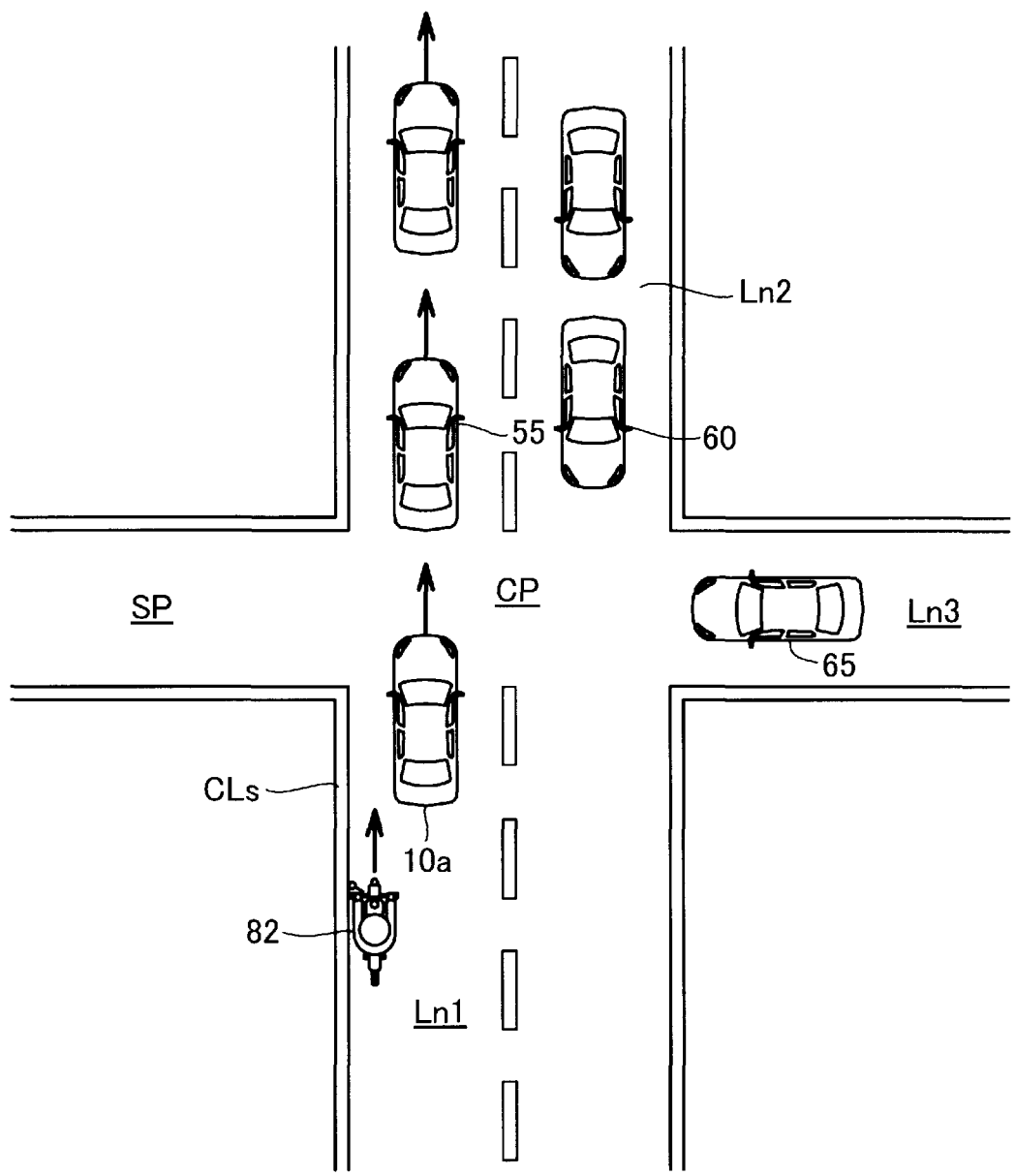
FIG. 18 is a fourth diagram schematically illustrating a fourth situation where fourth predetermined control operations of the vehicle control apparatus of the second embodiment are carried out.

This results in the own vehicle 10a starting to follow the preceding vehicle 55 upon the preceding vehicle 55 starting as illustrated in FIG. 18.

Figure 19:
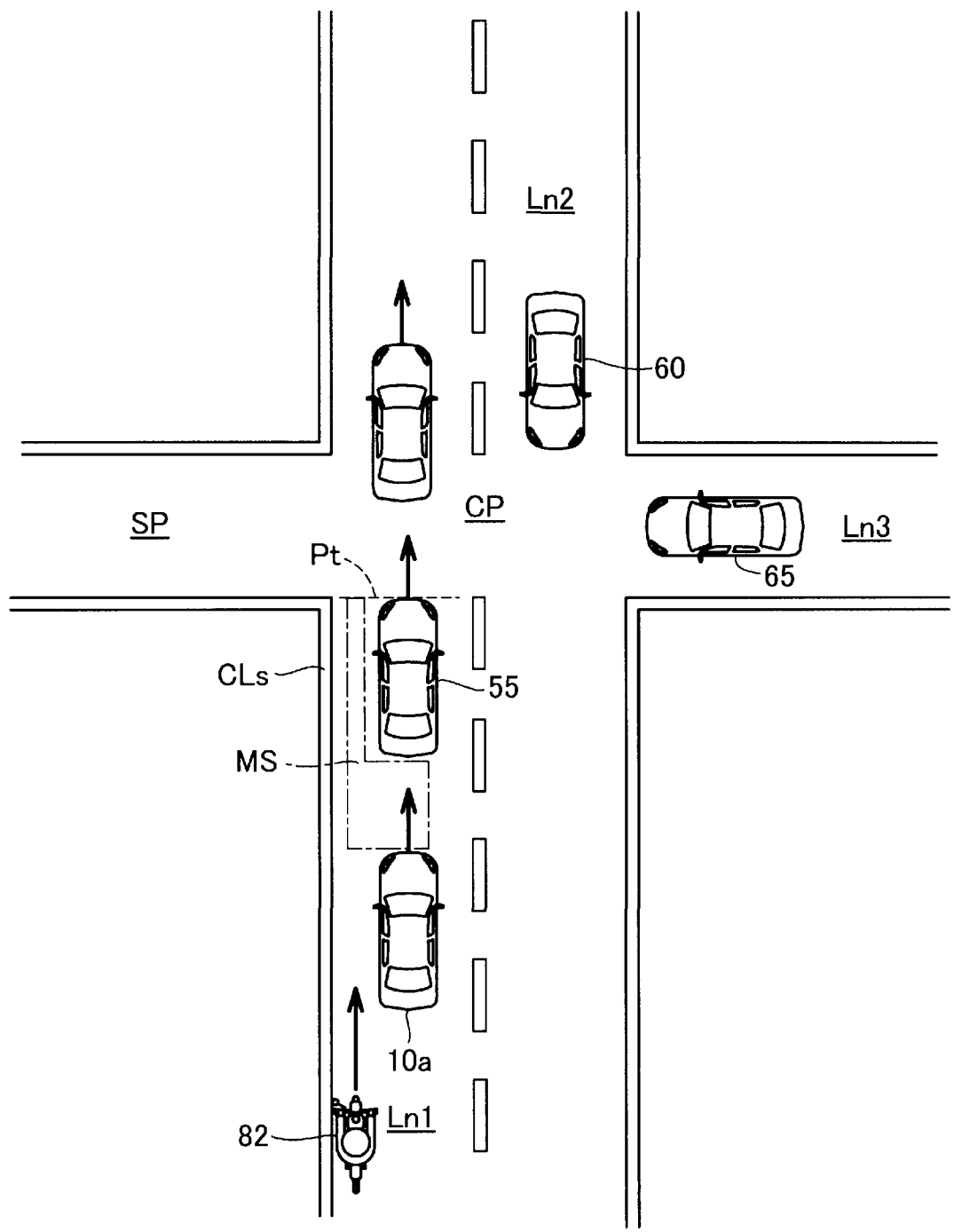
FIG. 19 is a fifth diagram schematically illustrating a fifth situation where fifth predetermined control operations of the vehicle control apparatus of the second embodiment are carried out.

FIG. 19 schematically illustrates a situation where it is determined that there is a movable space MS (YES in step S62) and that the safety condition is satisfied while the own vehicle 10a is traveling in the following traveling mode M1.

Figure 20:
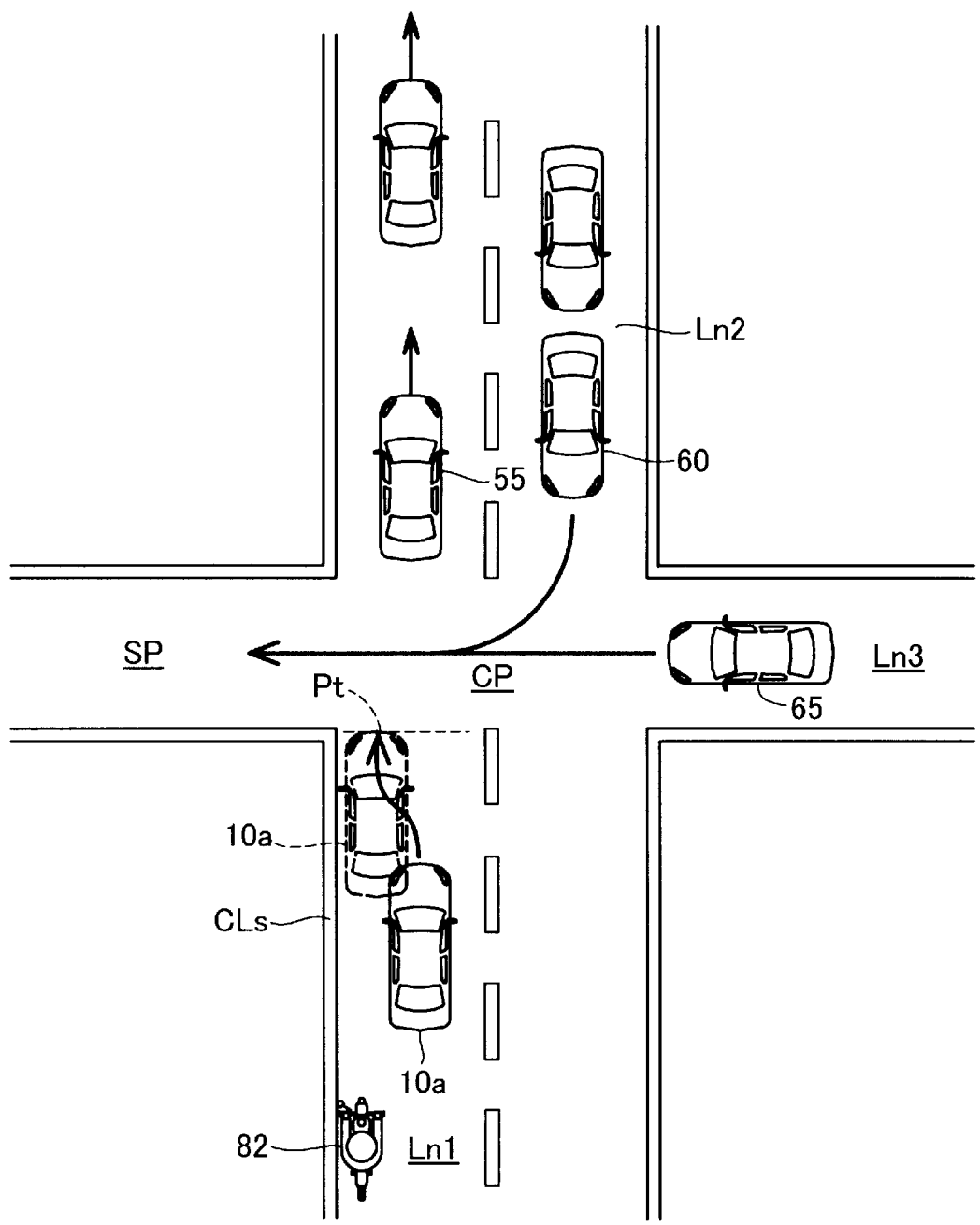
FIG. 20 is a sixth diagram schematically illustrating a sixth second situation where sixth predetermined control operations of the vehicle control apparatus of the second embodiment are carried out.

In this situation, the autonomous driving controller 29a performs inhibition mode M4 (see FIG. 20).

Figure 21:
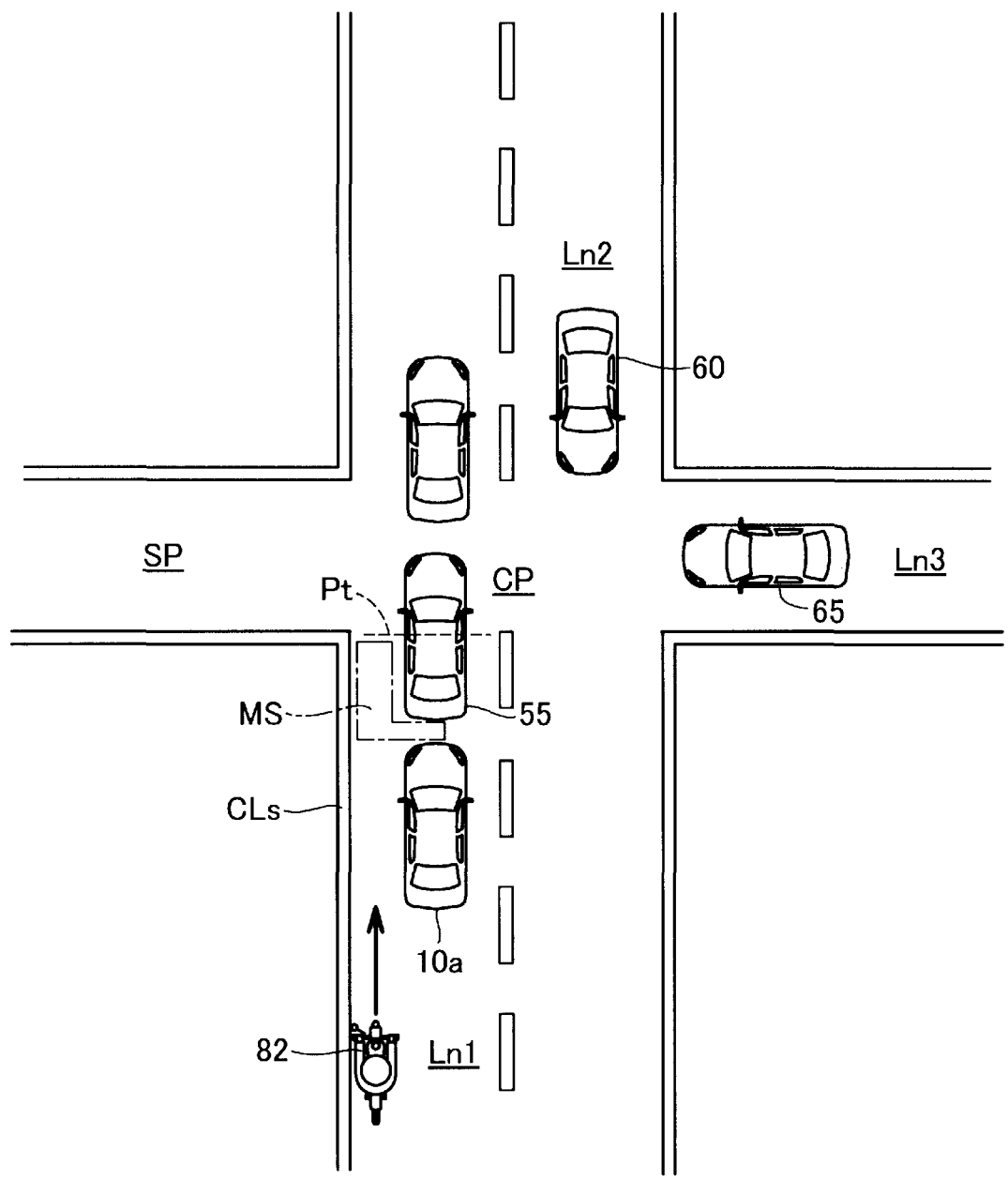
FIG. 21 is a seventh diagram schematically illustrating a sixth second situation where seventh predetermined control operations of the vehicle control apparatus of the second embodiment are carried out.

In addition, FIG. 21 schematically illustrates a situation where it is determined that there is a movable space MS (YES in step S62) and that the safety condition is satisfied when the own vehicle 10a is stopped in the following traveling mode M1.

Figure 22:
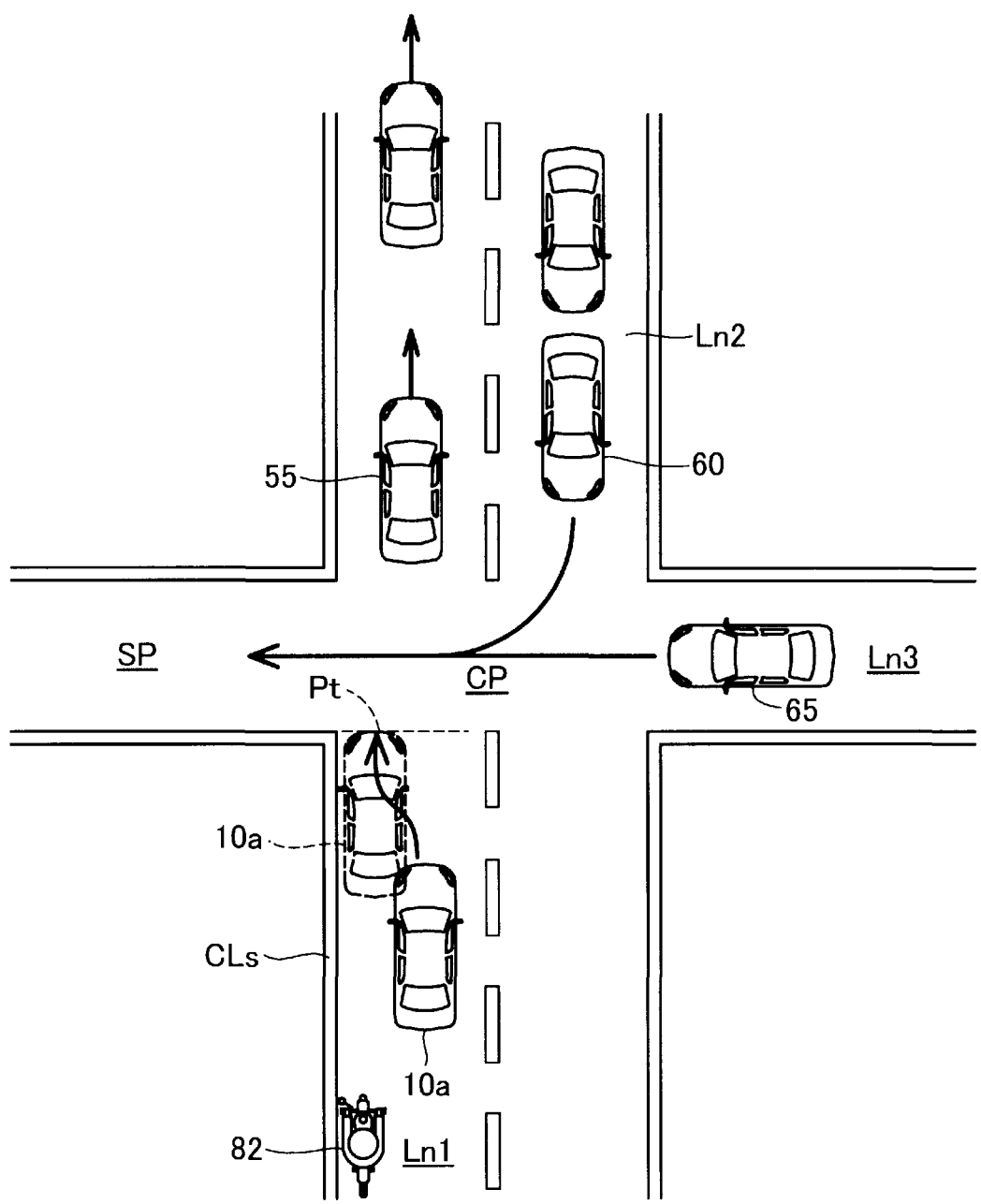
FIG. 22 is an eighth diagram schematically illustrating an eighth situation where eighth predetermined control operations of the vehicle control apparatus of the second embodiment are carried out.

In this situation, the autonomous driving controller 29a performs inhibition mode M4 (see FIG. 22).

Performing the inhibition mode M4 as illustrated in each of FIGS. 20 and 22 enables the first other crossing vehicle 60 or the second other crossing vehicle 65 to cross in front of the own vehicle 10. In addition, Performing the inhibition mode M4 as illustrated in each of FIGS. 20 and 22 reduces the possibility of the at least one rearward movable object 82 colliding with the first other crossing vehicle 60 or the second other crossing vehicle 65, because the inhibition mode M4 inhibits the at least one rearward movable object 82 from passing through the side of the own vehicle 10a.

MODIFICATIONS

Each of the first and second embodiments describes that the corresponding one of the vehicle control apparatuses 20 and 20a is applied to regions having traffic regulations in which people drive on the left, but can be applied to regions having traffic regulations in which people drive on the right. In this modification, the left and right used in each of the first and second embodiments are reversed. For example, the enterable space SP is a space branched off the right side of the travel lane.

When switching the running mode selected from the modes M1 to M4 to another mode, each of the autonomous driving apparatuses 29 and 29a of the first and second embodiments can be configured to cancel the running mode, for example, the following traveling mode M1, and to perform one mode, such as the crossing mode M3, selected from the remaining modes.

At least part of all functions provided by each of the vehicle control apparatuses 20 and 20a can be implemented by at least one processor; the at least one processor can be comprised of:
(1) The combination of at least one programmed processing unit, i.e. at least one programmed logic circuit, and at least one memory including software that causes the at least one programed logic circuit to implement all the functions;

(2) At least one hardwired logic circuit that implements all the functions; and (3) At least one hardwired-logic and at least one programmed-logic hybrid circuit that implements all the functions.

While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiments and their modifications can be replaced with a known structure having the same function as the corresponding technical feature. Each of the technical features described in the embodiments and their modifications can also be combined with at least one of the other technical features. At least one of the technical features described in the embodiments and their modifications can further be eliminated unless the at least one of the technical features is described as an essential element in the present specification.

The functions of each of the autonomous driving control apparatuses according to the first and second embodiments can be implemented by various embodiments; the various embodiments include autonomous driving control apparatuses and systems, programs for serving a computer as the functions, storage media, such as non-transitory media, storing the programs, and autonomous driving control methods.

What is claimed is:

1. A vehicle control apparatus for performing a following traveling mode and a constant-speed traveling mode, the following traveling mode representing a mode that causes an own vehicle to travel on a travel lane and follow a preceding vehicle travelling in front of the own vehicle, the constant-speed traveling mode representing a mode that causes the own vehicle to travel at a preset constant speed, the vehicle control apparatus comprising:

an other vehicle determiner configured to determine whether there is at least one other crossing vehicle that is estimated to cross in front of the own vehicle to thereafter enter an enterable space, the enterable space representing a space that is located in front of the own vehicle, and that is located on a portion branching from the travel lane;

an entry determiner configured to determine, while one of the following traveling mode and the constant-speed traveling mode is performed by the vehicle control apparatus, whether an entry condition is satisfied in response to determination that there is at least one other crossing vehicle, the entry condition representing a condition that enables the at least one other crossing vehicle to cross in front of the own vehicle to thereafter enter the enterable space without colliding with the own vehicle; and an autonomous driving controller configured to switch, upon the entry condition being determined to be satisfied, the performed one of the following traveling mode and the constant-speed traveling mode to a crossing mode that controls traveling of the own vehicle to ensure a predetermined space in front of the own vehicle, the predetermined space enabling the at least one other crossing vehicle to cross in front of the own vehicle.

2. The vehicle control apparatus according to claim 1, wherein:

the autonomous driving controller is configured to perform, upon the own vehicle traveling in the following traveling mode to follow the preceding vehicle at a first value of a following distance between the own vehicle and the preceding vehicle, any one of a first task and a second task to accordingly perform the crossing mode, the first task causing the own vehicle to be stopped just before the enterable space, the second task causing, upon the own vehicle being unable to be stopped just before the enterable space or being unnecessary to be stopped just before the enterable space, the own vehicle to be slowed down to accordingly ensure a second value of the following distance between the own vehicle and the preceding vehicle, the second value of the following distance being larger than the first value of the following distance in the following traveling mode.

3. The vehicle control apparatus according to claim 2, wherein:

the entry condition, upon the own vehicle traveling in the following traveling mode, includes:

a first entry condition that slowing down the own vehicle enables the own vehicle to be stopped at a first point located just before the enterable space; and a second entry condition that, until the own vehicle reaches a second point located before the first point based on slowing down of the own vehicle, changing the following distance from the first value to the second value larger than the first value enables the own vehicle to follow the preceding vehicle.

4. The vehicle control apparatus according to claim 1, wherein:

the autonomous driving controller is configured to, upon the own vehicle being stopped to follow stop of the preceding vehicle, continuously maintain the stop of the own vehicle independently of starting of the preceding vehicle.

5. The vehicle control apparatus according to claim 1, wherein:

the autonomous driving controller is configured to cause, upon the own vehicle traveling in the constant-speed traveling mode, the own vehicle to be stopped just before the enterable space to accordingly perform the crossing mode in response to the entry condition being determined to be satisfied.

6. The vehicle control apparatus according to claim 1, wherein:

the autonomous driving controller is configured to continuously perform the following traveling mode or the constant-speed traveling mode in response to the entry condition being determined to be not satisfied.

7. The vehicle control apparatus according to claim 1, further comprising:

a rearward movable object determiner configured to determine whether there is at least one rearward movable object in one or more other movable objects traveling behind the own vehicle in the travel lane, the at least one rearward movable object being enabled to move through a first side of the own vehicle to accordingly have passed through the own vehicle, the first side of the own vehicle being closer to the enterable space than an opposite second side of the own vehicle is, wherein:

the autonomous driving controller is adapted to perform an inhibition mode in place of the crossing mode, the inhibition mode causing the own vehicle to:

move toward a first side of the travel lane, which is closer to the enterable space than an opposite second side of the travel lane is, and be stopped at a given distance short of the enterable space; and the autonomous driving controller is configured to switch the performed one of the following traveling mode or the constant-speed traveling mode to the inhibition mode when:

the entry condition is satisfied, it is determined that there is at least one rearward movable object, and a safety condition is satisfied, the safety condition being a condition that a time to collision between the at least one rearward movable object and the own vehicle is larger or equal to a predetermined time.

8. The vehicle control apparatus according to claim 7, wherein:

the autonomous driving controller is configured to continuously perform the following traveling mode or the constant-speed traveling mode when the safety condition is not satisfied.

9. A method for performing a following traveling mode and a constant-speed traveling mode, the following traveling mode representing a mode that causes an own vehicle to travel on a travel lane and follow a preceding vehicle travelling in front of the own vehicle, the constant-speed traveling mode representing a mode that causes the own vehicle to travel at a preset constant speed, the method comprising:

determining whether there is at least one other crossing vehicle that is estimated to cross in front of the own vehicle to thereafter enter an enterable space, the enterable space representing a space that is located in front of the own vehicle, and that is located on a portion branching from the travel lane;

determining, while one of the following traveling mode and the constant-speed traveling mode is performed, whether an entry condition is satisfied in response to determination that there is at least one other crossing vehicle, the entry condition representing a condition that enables the at least one other crossing vehicle to cross in front of the own vehicle to thereafter enter the enterable space without colliding with the own vehicle; and switching, upon the entry condition being determined to be satisfied, the performed one of the following traveling mode and the constant-speed traveling mode to a crossing mode that controls traveling of the own vehicle to ensure a predetermined space in front of the own vehicle, the predetermined space enabling the at least one other crossing vehicle to cross in front of the own vehicle.

10. A system for performing a following traveling mode and a constant-speed traveling mode, the following traveling mode representing a mode that causes an own vehicle to travel on a travel lane and follow a preceding vehicle travelling in front of the own vehicle, the constant-speed traveling mode representing a mode that causes the own vehicle to travel at a preset constant speed, the system comprising:

a processor;

a non-transitory computer-readable storage medium; and a set of computer-executable instructions stored on the non-transitory computer-readable storage medium that cause the processor to:

determine whether there is at least one other crossing vehicle that is estimated to cross in front of the own vehicle to thereafter enter an enterable space, the enterable space representing a space that is located in front of the own vehicle, and that is located on a portion branching from the travel lane;

determine, while one of the following traveling mode and the constant-speed traveling mode is performed, whether an entry condition is satisfied in response to determination that there is at least one other crossing vehicle, the entry condition representing a condition that enables the at least one other crossing vehicle to cross in front of the own vehicle to thereafter enter the enterable space without colliding with the own vehicle; and switch, upon the entry condition being determined to be satisfied, the performed one of the following traveling mode and the constant-speed traveling mode to a crossing mode that controls traveling of the own vehicle to ensure a predetermined space in front of the own vehicle, the predetermined space enabling the at least one other crossing vehicle to cross in front of the own vehicle.

\* \* \* \* \*